(12) United States Patent
Gil et al.

(10) Patent No.: US 12,492,099 B2
(45) Date of Patent: Dec. 9, 2025

(54) METHODS AND SYSTEMS FOR DELIVERING OR ACCEPTING A PARCEL AT A ROOFTOP VIA AN AERIAL VEHICLE

(71) Applicant: United Parcel Service of America, Inc., Atlanta, GA (US)

(72) Inventors: Julio Gil, Atlanta, GA (US); Julian Bell, Atlanta, GA (US); Jared Nauert, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 505 days.

(21) Appl. No.: 18/166,855

(22) Filed: Feb. 9, 2023

(65) Prior Publication Data

US 2024/0270538 A1    Aug. 15, 2024

(51) Int. Cl.
| | | |
|---|---|---|
| *B66B 1/06* | (2006.01) |
| *B61J 1/02* | (2006.01) |
| *B64D 1/22* | (2006.01) |
| *B64F 1/32* | (2006.01) |
| *B64U 101/64* | (2023.01) |
| *B66B 1/34* | (2006.01) |

(52) U.S. Cl.
CPC ............ *B66B 1/06* (2013.01); *B61J 1/02* (2013.01); *B64D 1/22* (2013.01); *B64F 1/32* (2013.01); *B66B 1/3476* (2013.01); *B64U 2101/64* (2023.01)

(58) Field of Classification Search
CPC . B66B 1/06; B66B 1/3476; B61J 1/02; B64D 1/22; B64F 1/32; B64U 2101/64; B64U 70/90; G06Q 10/083; G06Q 10/0836; A47G 29/141
See application file for complete search history.

(56) References Cited

U.S. PATENT DOCUMENTS

| | | |
|---|---|---|
| 2020/0180880 A1 | 6/2020 | Gil et al. |
| 2020/0198801 A1 | 6/2020 | Carthew et al. |
| 2022/0017222 A1 | 1/2022 | Benner |

FOREIGN PATENT DOCUMENTS

| | | |
|---|---|---|
| EP | 3892548 A1 | 10/2021 |
| WO | 2014/080390 A2 | 5/2014 |

OTHER PUBLICATIONS

European search report received for European Application No. 24152448.7, mailed on Jun. 26, 2024, 8 pages.

*Primary Examiner* — Jacob S. Scott
*Assistant Examiner* — Miraj T. Patel
(74) *Attorney, Agent, or Firm* — Shook, Hardy & Bacon L.L.P.

(57) ABSTRACT

The technology disclosed herein relates to a rooftop platform to facilitate a delivery of a parcel by an aerial vehicle. The rooftop platform may comprise an elevator apparatus at least partially accessible via the rooftop platform. The rooftop platform may also comprise a rotatable turntable mounted to the rooftop platform. The rotatable turntable can be rotated to position the parcel on the elevator apparatus. The rotatable turntable may have tracks for receiving track wheels of a parcel containment unit. In some embodiments, the parcel may be positioned on the elevator apparatus at a top surface of a lift cabin of the elevator apparatus. The rooftop platform may also comprise a landing area for the aerial vehicle to deliver or receive the parcel containment unit via the rotatable turntable.

20 Claims, 10 Drawing Sheets

METHODS AND SYSTEMS FOR DELIVERING OR ACCEPTING A PARCEL AT A ROOFTOP VIA AN AERIAL VEHICLE

BACKGROUND

Home delivery of parcels has traditionally been performed using human couriers. Delivery companies have begun to explore the possibility of delivering parcels using unmanned systems in collaboration with human couriers to increase delivery efficiency and to decrease the physical demands on human couriers. However, there remain unsolved problems when delivering parcels using aerial technologies.

SUMMARY

At a high level, aspects described herein relate to a rooftop platform to facilitate a delivery (or retrieval) of a parcel by an aerial vehicle (e.g., a drone, an unmanned aerial vehicle). The rooftop platform comprises an elevator apparatus that is at least partially accessible via the rooftop platform (e.g., by modifying and extending an elevator apparatus within a building). A rotatable turntable is mounted to the rooftop platform. The rotatable turntable may have tracks for receiving track wheels or one or more track components of a parcel containment unit. In some embodiments, the parcel containment unit comprises a plurality of lockers, and each of the plurality of lockers may have a locking system. The rooftop platform may also comprise a landing area for the UAV to deliver or receive a parcel or the parcel containment unit via the rotatable turntable. The rooftop platform can be used as part of a drone delivery system that can also include a computer application.

In some embodiments, the elevator apparatus has a lift frame extending through a surface of the rooftop platform. Continuing the example, the elevator apparatus may have an upper pulley support structure located at a height above the landing area of the rooftop platform. In some embodiments, the elevator apparatus is at least partially accessible via the rooftop platform from a top surface of a lift cabin of the elevator apparatus, wherein the top surface is capable of supporting the parcel containment unit.

In some embodiments, the rooftop platform comprises a shelter unit for the parcel containment unit. In embodiments, the shelter unit is secured by a portion of the elevator apparatus. The rotatable turn table can facilitate moving the parcel containment unit, via the tracks for receiving track wheels of the parcel containment unit, to the shelter unit and to the elevator apparatus. The shelter unit can protect parcels and parcel containment units from adverse weather conditions. The shelter unit can also allow for broader time windows for parcel delivery.

Another embodiment includes a method for facilitating delivery of a parcel by a UAV via a rooftop platform. The method comprises receiving delivery data associated with the parcel. Based at least in part on the delivery data, the method further comprises determining the parcel is to be delivered to the rooftop platform, the rooftop platform including an elevator apparatus at least partially accessible via the rooftop platform and a rotatable turntable mounted to the rooftop platform. Further, the method comprises receiving the parcel from the UAV at the rotatable turntable mounted to the rooftop platform. In addition, the method comprises determining, via at least one sensor associated with the rooftop platform, the parcel is secured by the rotatable turntable. The method also comprises receiving the parcel at the elevator apparatus.

Another embodiment includes a method for facilitating pickup of a parcel by a UAV via a rooftop platform. The method comprises receiving delivery data associated with the parcel. Based at least in part on the delivery data, the method further comprises determining the parcel is to be received from the rooftop platform, the rooftop platform including an elevator apparatus at least partially accessible via the rooftop platform and a rotatable turntable mounted to the rooftop platform. Further, the method comprises receiving the parcel, from the elevator apparatus, at the rotatable turntable mounted to the rooftop platform. In some embodiments, the method comprises determining, via at least one sensor associated with the rooftop platform, the parcel is secured by the rotatable turntable. The method also comprises determining the parcel was received by the UAV.

Another embodiment includes one or more non-transitory computer storage media having computer-executable instructions embodied thereon, that when executed by at least one processor, cause operations comprising receiving delivery data associated with a parcel. The operations further comprise determining, via at least one sensor, that the parcel has been received, from a UAV, by a rotatable turntable mounted to a rooftop platform. The rooftop platform includes an elevator apparatus at least partially accessible via the rooftop platform. The operations also comprise causing the rotatable turntable to position the parcel on the elevator apparatus.

Another embodiment includes one or more non-transitory computer storage media having computer-executable instructions embodied thereon, that when executed by at least one processor, cause operations comprising receiving delivery data associated with a parcel. The operations further comprise determining, via at least one sensor, that the parcel for delivery has been received by a rotatable turntable mounted to a rooftop platform. The rooftop platform includes an elevator apparatus at least partially accessible via the rooftop platform. The operations also comprise causing the rotatable turntable to position the parcel for receipt by the UAV.

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

Additional objects, advantages, and novel features of the technology will be set forth in part in the description that follows, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

Figure 1:
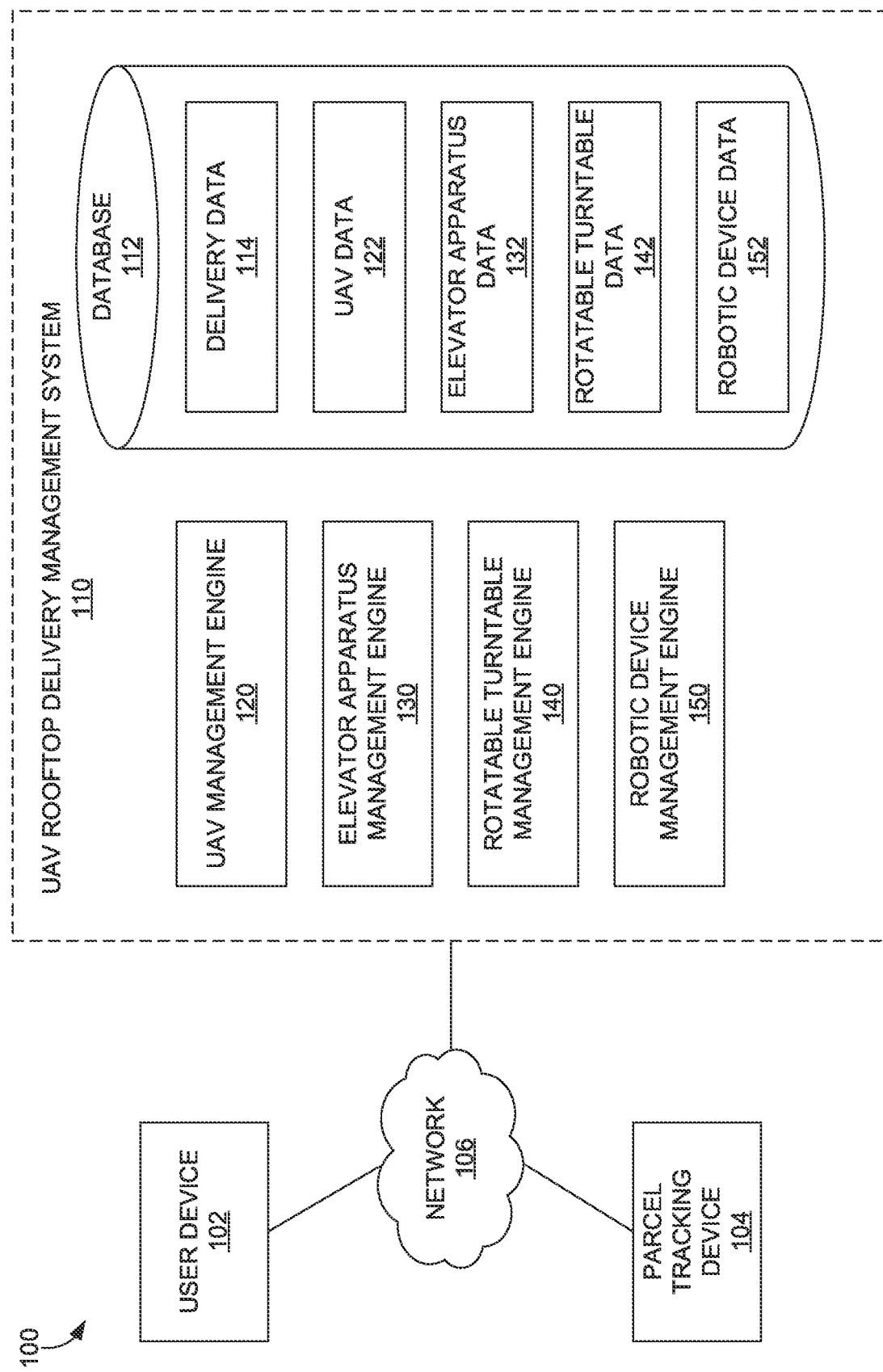
FIG. 1 is an example operating environment comprising an unmanned aerial vehicle (UAV) rooftop delivery management system, in accordance with embodiments described herein.

The present disclosure provides for a platform system for facilitating parcel deliveries ("to drop off" and "to pick up") by an aerial vehicle (e.g., an unmanned aerial vehicle (UAV), an autonomous aerial vehicle, a semi-autonomous aerial vehicle, a remote piloted aerial system, a delivery drone). The platform system has one or more of an elevator apparatus, a rotatable turntable, a computer application, or one or more combinations thereof. The computer application can facilitate communications of delivery data (e.g., a delivery time and location) between a user device and the platform system.

Throughout this disclosure, "UAV" can include systems that are capable of operating for at least a period of time without input from an on-board human. A semi-autonomous aerial vehicle may sometimes include a human on board who is capable of taking control of the aerial vehicle or providing instructions to the aerial system. In embodiments, a UAV can be controlled or partially controlled remotely (e.g., by a remote human pilot). Some unmanned systems may operate autonomously by receiving instructions from a computer program. In some embodiments, to complete an objective, an aerial vehicle may operate autonomously, under the guidance of received instructions, or under partial or total control of a human pilot.

In addition, words such as "a" and "an," unless otherwise indicated to the contrary, may also include the plural as well as the singular. Thus, for example, the constraint of "a feature" is satisfied where one or more features are present. As such, an element in the singular may refer to "one or more."

Further, the term "or" includes the conjunctive, the disjunctive, and both (a or b thus includes either a or b, as well as a and b).

Additionally, the term "some" may refer to "one or more."

The term "combination" (e.g., one or more combinations thereof) may refer to, for example, "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Additionally, "user device," as used herein, is a device that has the capability of using a wireless telecommunications network, and may also be referred to as a "computing device," "mobile device," "user equipment" (UE), or "wireless communication device." A user device, in some aspects, may take on a variety of forms, such as a PC, a laptop computer, a tablet, a mobile phone, a PDA, a server, an Internet of Things device, any other device capable of communicating with other devices (e.g., by transmitting or receiving a signal) using a wireless communication, or one or more combinations thereof. A user device may be, in an embodiment, similar to user device 102 described herein with respect to FIG. 1. A user device may also be, in another embodiment, similar to user device 1000, described herein with respect to FIG. 10.

As noted above, the user device may include Internet of Things devices, such as one or more of the following: a sensor (e.g., a temperature sensor), controller (e.g., a lighting controller, a thermostat), an appliance (e.g., a smart refrigerator, a smart air conditioner, a smart alarm system), other Internet of Things devices, or one or more combinations thereof. Internet of Things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, a drone, a remote weather station, another wireless communication device, or one or more combinations thereof.

As used herein, the term "parcel" may include a tangible or physical object. In one embodiment, a parcel may be, or be enclosed in, one or more parcel containment units, one or more parcels, envelopes, parcels, bags, containers, loads, crates, parcels banded together, vehicle parts, pallets, drums, another type of parcel, or one or more combinations thereof. A parcel may include a device (e.g., a chip (e.g., an integrated circuit chip), RFID, NFC, Bluetooth, Wi-Fi, another type of communication device, or one or more combinations thereof). For example, the device of the parcel may transmit or receive-via a parcel tracking device-a destination address, a pickup address, unique identifier codes, GPS data, other location data, a delivery date, a pickup date, an associated time range, another type of delivery data, or one or more combinations thereof.

As will be appreciated from the present disclosure, the various embodiments of the technology described herein offer a number of advantages. For example, the use of UAVs to deliver packages to or from the rooftop platform comprising the elevator apparatus and the rotatable turntable provides for an improved delivery system that enhances flexibility in the delivery of parcels in a variety of environments by utilizing a rotatable turntable capable of accepting a parcel or parcel containment unit from a UAV and by utilizing an elevator apparatus for a more efficient delivery to a particular unit or floor within a building or enclosed area corresponding to the rooftop platform. In addition, a UAV can traverse various geographic areas quickly more efficiently than a road-going vehicles. Moreover, the technology disclosed herein enables multiple deliveries to one or more floors within the building or enclosed area, corresponding to the rooftop platform, to occur simultaneously or within a time period that is shorter than a time period associated with deliveries to a building at a single location within that building or adjacent to that building.

In addition, a recipient or deliverer within the building can set particular locations within the building and particular times for delivery or retrieval, and can also receive up-to-date and interactive information relating to the delivery process. As such, the technology described herein provides for greater flexibility in package routing and management.

The platform system for facilitating parcel deliveries ("to drop off" and "to pick up") by one or more UAVs comprises an elevator apparatus and a rotatable turntable that may communicate with different devices and systems, such as a user device or a UAV, for example. In addition, the platform may include one or more of several different sensors to facilitate communication and delivery, such as antennas, cameras, weather sensors, pressure sensors, motion sensors, heat sensors, other types of sensors, or one or more combinations thereof.

The elevator apparatus, for example, is at least partially accessible via a rooftop platform. For example, the elevator apparatus may be at least partially accessible via the rooftop platform from a top surface of a lift cabin of the elevator apparatus, wherein the top surface is capable of supporting the parcel containment unit. The elevator apparatus, in some embodiments, may have a lift frame extending through a surface of the rooftop platform and an upper pulley support structure located at a height above the landing area of the rooftop platform.

The rotatable turntable can move the parcel or parcel containment unit (e.g., via tracks on the rotatable turntable and track wheels on the parcel containment unit) from the rotatable turntable to the top of the lift cabin. In some embodiments, the top of the lift cabin has tracks aligned with the tracks of the rotatable turntable for receiving and securing the parcel containment unit. In addition, the rotatable turntable can receive the parcel or parcel containment unit from the elevator apparatus for receipt of the parcel containment unit by the UAV. In some embodiments, the parcel or parcel containment unit may be moved to the elevator apparatus from the rotatable turntable (or from the elevator apparatus and to the rotatable turntable) by a person or robotic device. In some cases, the parcel may be received, from a UAV, by a parcel containment unit that has track wheels and is secured by the rotatable turntable via tracks. In some embodiments, the parcel containment unit is received from the UAV.

The elevator apparatus, the rotatable turntable, and other components of the rooftop platform may be operated autonomously using predetermined or learned instructions. The elevator apparatus, the rotatable turntable, and other components of the rooftop platform may also be controlled using a computer application, sometimes referred to as an "app" or "mobile app." For example, the elevator apparatus may be raised and lowered in response to instructions received from a user device executing an app.

The aforementioned embodiments have been provided as examples of the technology that may be practiced from the present disclosure. They are intended to be examples and are provided to aid in understanding the technology and its benefits. Additional features and embodiments are further described with reference to the figures. Having described a high level summary of the technology, additional features and embodiments are provided below in further detail with reference to the figures.

Operating Environment

FIG. 1 provides an example operating environment 100 that may be used for facilitating parcel deliveries ("to drop off" and "to pick up") by one or more UAVs. Example operating environment 100 comprises user device 102, parcel tracking device 104, network 106, and UAV rooftop delivery management system 110. The UAV rooftop delivery management system 110 comprises database 112, which includes delivery data 114, UAV data 122, elevator apparatus data 132, rotatable turntable data 142, and robotic device data 152. The UAV rooftop delivery management system 110 also comprises UAV management engine 120, elevator apparatus management engine 130, rotatable turntable management engine 140, and robotic device management engine 150.

Example operating environment 100 is but one example of a suitable environment for facilitating parcel deliveries by one or more UAVs, and is not intended to suggest any limitation as to the scope of use or functionality of the invention. Neither should the environment 100 be interpreted as having any dependency or requirement relating to any one or combination of components illustrated. As an example, the database 112 can also include a plurality of models (e.g., machine learning models) for the UAV rooftop delivery management system 110 to learn instructions for facilitating the parcel delivery by the one or more UAVs. As another example, the UAV rooftop delivery management system 110 may include a second elevator apparatus management engine for a second elevator apparatus. In yet another example, the elevator apparatus management engine 130 and the rotatable turntable management engine 140 are a single engine.

Components of example operating environment 100, such as user device 102 and parcel tracking device 104, can be user devices on the user side or client side of example operating environment 100, while the UAV rooftop delivery management system 110 may operate on a backend or in some instances a server side of example operating environment 100. Such user-side components may facilitate the completion of tasks and make a record of activities, such as scanning parcels at particular locations and times, requesting delivery or pickup of a parcel, determining the location of a user or a parcel, and so on. The UAV rooftop delivery management system 110 may comprise distributed software operating across user- and server-side, or server-side software designed to work in conjunction with user-side software on user-side devices, so as to implement any combination of the features and functionalities of the present technology. This division of operating environment 100 is illustrated to be one example of a suitable environment, and there is no requirement for each implementation that any combination of UAV rooftop delivery management system 110 and user-side devices exist as separate entities.

Figure 10:
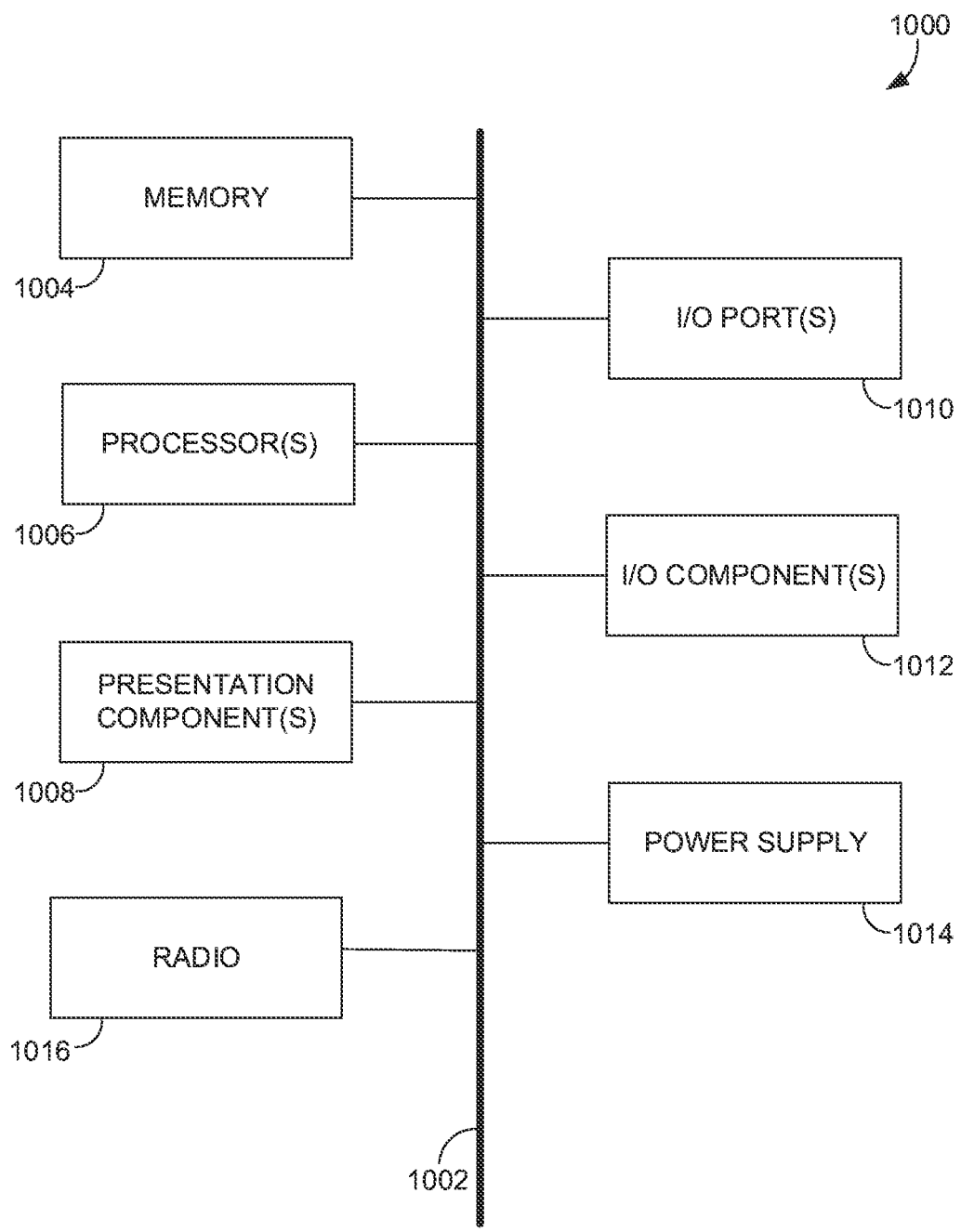
FIG. 10 illustrates an example user device, in accordance with embodiments described herein.

User device 102, such as user device 1000 of FIG. 10 for example, is a device that is suitable for collecting information from the user. By way of example and not limitation, user device 102 may be embodied as a personal computer, a laptop computer, a mobile device, a smartphone, a tablet computer, a smart watch, a wearable computer, a fitness tracker, a virtual reality headset, augmented reality glasses, a personal digital assistant, an MP3 player, a global positioning system (GPS) or device, a digital camera, a video player, a handheld communications device, a gaming device or system, an entertainment system, a vehicle computer system, an embedded system controller, a remote control, an appliance, a consumer electronic device, a workstation, another type of suitable device, or one or more combinations of these delineated devices, whether integrated or distributed. In some cases, user device 102 may include devices such as smart mailboxes; smart home appliances; such as a smart refrigerator; smart thermostat; personal assistant, such as Amazon Echo or Google Home; or other smart systems that are capable of providing information to a user and collecting information from a user. In some cases, a user (e.g., human or robotic device user) may interact with the user device 102 by running apps, such as computer software applications stored locally or accessed from a distributed data store. In some cases, apps may access information about the user through other apps or services operating on the user device 102 or operating in the cloud and associated with user device 102. For example, in some embodiments a user may provide permission for a user-side logistics app to access other apps that the user may utilize, such as a calendar app, a contacts app, a location app or service, a communications app or service such as email or instant messaging, which may include accessing a user's email account with permission, a gaming app, a microphone app, and so on, in order to access and receive information about the user. In this way, additional information about a user may be received by accessing apps and services on one or more user devices 102 utilized by the user.

Parcel tracking device 104 can communicate with one or more user devices 102 and one or more servers (e.g., UAV rooftop delivery management system 110). For example, the parcel tracking device 104 can provide an indication of a location of a corresponding parcel for receipt or delivery. Parcel tracking device 104 may comprise one or more of a sensor, a battery, a barcode, a smart label, a wireless transceiver, a beacon, another type of parcel tracking sensor, or one or more combinations thereof. In some embodiments, the parcel tracking device 104 is part of a wireless tracking system that reports location information (e.g., GPS data) to user device 102 or UAV rooftop delivery management system 110 in real-time, near real-time, at periodic intervals, at certain stages during a delivery (e.g., when departing a factory), or one or more combinations thereof. In some embodiments, the parcel tracking device 104 can wirelessly communicate location information via Bluetooth, Bluetooth Low Energy, Wi-Fi, Wi-Fi peer-to-peer (e.g., Wi-Fi Direct, Neighbor Awareness Networking), ultra-wide band, millimeter wave, low power or ultra-low power wireless communication, near field communication, RFID, another type of communication protocol, or one or more combinations thereof. In some embodiments, the parcel tracking device 104 may be capable of updating a server with a current location (e.g., determined by the parcel tracking device 104 or provided to parcel tracking device 104 from another device) via one or more communication protocols.

As depicted by example operating environment 100, user device 102 (as well as additional user devices), parcel tracking device 104 (as well as additional parcel tracking devices), and UAV rooftop delivery management system 110 may wirelessly communicate via network 106 using one or more wireless communication standards. For example, the wireless communications may include using a wireless networking (e.g., Wi-Fi) or one or more peer-to-peer wireless communication protocols (e.g., Bluetooth, Wi-Fi peer-to-peer, other peer-to-peer protocols, or one or more combinations thereof), as well as a cellular communication protocol (e.g., GSM, UMTS (associated with WCDMA or TD-SCDMA air interfaces, for example), LTE, LTE-A, 5G NR, HSPA, 3GPP2 CDMA2000 (e.g., 1×RTT, 1×EV-DO, HRPD, eHRPD), other cellular communication protocols, or one or more combinations thereof). The user device 102, the parcel tracking device 104, and UAV rooftop delivery management system 110 may additionally or alternatively communicate using one or more global navigational satellite systems (GNSS, such as GPS or GLONASS for example), any of which is generally referred to as "GPS," one or more mobile television broadcasting standards (e.g., ATSC-M/H or DVB-H), another wireless communication protocol, or one or more combinations thereof. In some embodiments, the user device 102, the parcel tracking device 104, and the UAV rooftop delivery management system 110 may include separate transmit or receive chains (e.g., including separate antennas and other radio components) for each wireless communication protocol with which it is configured to communicate.

Figure 2:
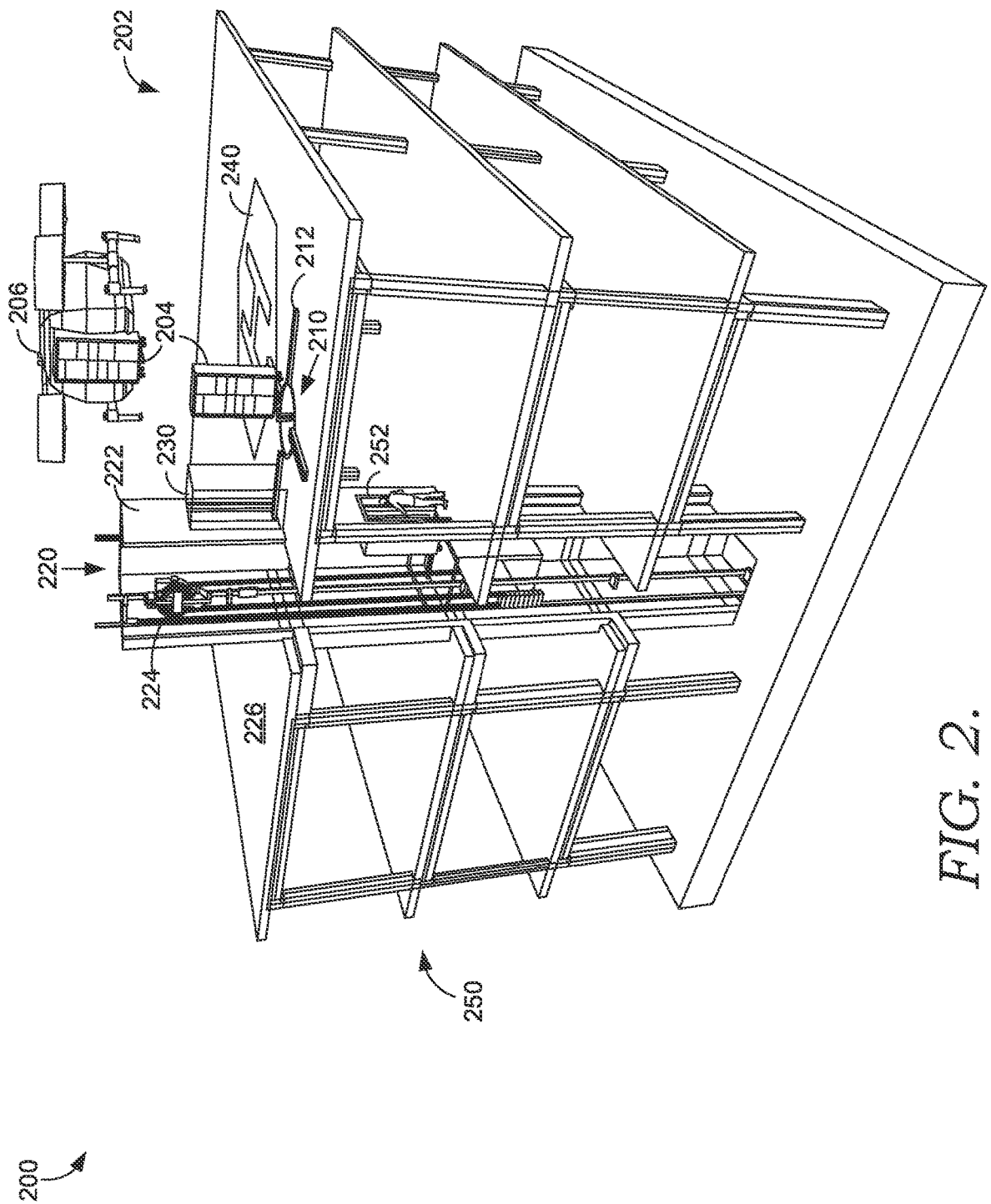
FIG. 2 is an example environment for a rooftop platform that facilitates receipt and delivery of a parcel by a UAV, in accordance with embodiments described herein.

The UAV management engine 120 of UAV rooftop delivery management system 110 can facilitate operations of one or more UAVs, such as UAV 206 of FIG. 2. For example, the operations can be facilitated by using the database 112, including the delivery data 114 and UAV data 122. In embodiments, the one or more UAVs can deliver one or more parcels or parcel containment units to (or from) a rooftop platform. The rooftop platform comprises an elevator apparatus, which is at least partially accessible via the rooftop platform, and a rotatable turntable mounted to the rooftop platform. In some embodiments, the rooftop platform also has one or more landing areas for the one or more UAVs to deliver or receive the one or more parcels or the one or more parcel containment units.

The delivery data 114 may comprise one or more dimensions, weight, and material of the one or more parcels or the one or more parcel containment units. The delivery data 114 may additionally or alternatively include a delivery time or time range, a delivery date, a delivery location, a retrieval location, an intermediate delivery location of an entire delivery route, other types of delivery data, or one or more combinations thereof. In some embodiments, the delivery data 114 may also include a building height of the delivery location or the retrieval location of the rooftop platform that comprises the elevator apparatus and the rotatable turntable.

Additionally, the UAV data 122, which can be used to facilitate the operations of the one or more UAVs or other operations of the rooftop platform, may include UAV sensor data, such as images, videos, thermal readings, GPS data, radar data, sonar data, light detection and ranging data, weather data, environmental data, other types of UAV sensor data, or one or more combinations thereof. In addition, the UAV data 122 may include historical UAV sensor data used to identify objects (e.g., images). For example, the one or more UAVs managed by the UAV management engine 120 can identify the rooftop platform, the elevator apparatus of the rooftop platform, the landing area for the UAV on the rooftop platform, the rotatable turntable of the rooftop platform, tracks located on the rotatable turntable of the rooftop platform, other objects associated with the rooftop platform, or one or more combinations thereof, using the UAV sensor data.

Further, the UAV data 122 used to facilitate the operations of the one or more UAVs or other operations of the rooftop platform may also include UAV operational parameter data, UAV mechanical or electrical data, UAV historical travel data, other types of UAV data, or one or more combinations thereof. For example, UAV operational parameter data, UAV mechanical data, UAV electrical data, or one or more combinations thereof, can be used by the UAV management engine 120 together with the UAV sensor data (e.g., images, videos, thermal readings, GPS data, radar data, sonar data, light detection and ranging data, weather data, environmental data) to facilitate receipt of the parcel or the parcel containment unit by the rotatable turntable of the rooftop platform. The UAV management engine 120 can also use one or more of the delivery data 114 and the UAV data 122 for facilitating operations of one or more UAVs to deliver (or retrieve) one or more parcels or parcel containment units to (or from) the rooftop platform.

The elevator apparatus management engine 130 of UAV rooftop delivery management system 110 can facilitate operations of the elevator apparatus (e.g., elevator apparatus 220 of FIG. 2) of the rooftop platform for the delivery or retrieval of the one or more parcels or parcel containment units. The elevator apparatus management engine 130 can use data from the database 112 (e.g., delivery data 114 and elevator apparatus data 132) to facilitate retrieval, by the elevator apparatus, of the one or more parcels or the one or more parcel containment units. For example, the elevator apparatus management engine 130 may use dimensions, weight, and material of the one or more parcels or the one or more parcel containment units. As an example, the elevator apparatus management engine 130 may facilitate the receipt of a parcel or parcel containment unit having a weight below a threshold, dimensions that are below a threshold, other size factors that are below a threshold, or one or more combinations thereof. As another example, the elevator apparatus management engine 130 may postpone the receipt of a parcel or parcel containment unit based on a delivery time, environmental data (e.g., detected by a UAV sensor), other data from database 112, or one or more combinations thereof.

In embodiments, the elevator apparatus data 132 may correspond to elevator sensor data (e.g., from an imaging sensor (such as a camera), from a thermal sensor, from a weight sensor on a location of the elevator apparatus that receives or secures the parcel or parcel containment unit, from a motion sensor). For example, one or more elevator sensors may be located on an interior portion of a lift cabin (e.g., lift cabin 324 of FIG. 3) of the elevator apparatus. As another example, one or more sensors may be located on a portion of the elevator apparatus external to the lift cabin. In some embodiments, the elevator apparatus data 132 may include an occupant traffic history associated with particular days and times (e.g., high occupant traffic during a particular time of a particular day). In some embodiments, the elevator apparatus management engine 130 can facilitate retrieval, by the elevator apparatus, of the one or more parcels or the one or more parcel containment units based on the occupant travel history determined using one or more imaging sensors, for example. In some embodiments, the elevator apparatus management engine 130 can facilitate the retrieval of the one or more parcels or the one or more parcel containment units based on detecting a weight of the one or more parcels or the one or more parcel containment units via the weight sensor. In some embodiments, the elevator apparatus management engine 130 can facilitate the retrieval of the one or more parcels or the one or more parcel containment units based on motion detected by a motion sensor of the rotatable turntable.

The rotatable turntable management engine 140 of UAV rooftop delivery management system 110 can facilitate operations of the rotatable turntable (e.g., rotatable turntable 210 of FIG. 2) of the rooftop platform for the delivery or retrieval of the one or more parcels or parcel containment units associated with the one or more UAVs. The rotatable turntable management engine 140 can use data from the database 112 (e.g., delivery data 114 and rotatable turntable data 142) to facilitate retrieval, by the rotatable turntable, of the one or more parcels or the one or more parcel containment units. For example, the rotatable turntable has tracks for receiving the one or more parcels or the one or more parcel containment units. The tracks of the rotatable turntable can receive and secure track wheels (e.g., track wheels 405 of FIG. 4) attached to the one or more parcel containment units, for example. As another example, the tracks of the rotatable turntable can receive and secure tracks affixed to the one or more parcel containment units.

In some embodiments, the rotatable turntable management engine 140 facilitates receiving a parcel or parcel containment unit based on a weight of the parcel or parcel containment unit associated with the delivery data 114, a material of the parcel or parcel containment unit, or one or more combinations thereof. Additionally or alternatively, the rotatable turntable management engine 140 facilitates receiving the parcel or parcel containment unit using rotatable turntable data 142 comprising sensor data. For example, one or more tracks located on or around the rotatable turntable may have one or more pressure sensors, one or more fiber optic sensors, one or more temperature sensors, one or more accelerometers, one or more gyroscopic sensors, one or more inertial sensors, another type of track sensor, or one or more combinations thereof. In embodiments, the rotatable turntable management engine 140 can facilitate moving the parcel or parcel containment unit across the tracks on the rotatable turntable based on the sensor data from one or more of these sensors. Additionally, the rotatable turntable management engine 140 can facilitate moving the parcel or parcel containment unit, based on the sensor data associated with the tracks of the rotatable turntable or the tracks adjacent to the rotatable turntable (e.g., tracks 312A, 312B, 312C, and 312E of FIG. 3), from the tracks on the rotatable turntable and to another track on the rooftop platform (e.g., tracks 312F of FIG. 3) that are in communication with the tracks on the rotatable turntable. Furthermore, the rotatable turntable management engine 140 can facilitate receiving the parcel or parcel containment unit from one or more tracks adjacent to the rotatable turntable.

For example, the rotatable turntable management engine 140 can facilitate movement of the parcel or parcel containment unit at an acceleration, detectable by the one or more accelerometers, that is below a threshold. As another example, the rotatable turntable management engine 140 can facilitate movement of the parcel or parcel containment unit such that the pressure detected by the one or more pressure sensors is below a threshold. In yet another example, the rotatable turntable management engine 140 can facilitate movement of the parcel or parcel containment unit such that the temperature detected by the one or more temperature sensors is below a threshold. In yet another example, the rotatable turntable management engine 140 can facilitate movement of the parcel or parcel containment unit such that an inertial measurement detected by the one or more inertia sensors is below a threshold or within a particular range. In yet another example, the rotatable turntable management engine 140 can facilitate movement of the parcel or parcel containment unit such that a strain measurement detected by the one or more fiber optic sensors is below a threshold. In yet another example, the rotatable turntable management engine 140 can facilitate movement of the parcel or parcel containment unit such that a rotational motion measurement detected by the one or more gyroscopes is within a threshold range.

The robotic device management engine 150 of UAV rooftop delivery management system 110 can facilitate operations of one or more robotic devices (e.g., an autonomous or semi-autonomous robot) of the rooftop platform for the delivery or retrieval of the one or more parcels or parcel containment units. The robotic device management engine 150 can use data from the database 112 (e.g., delivery data 114 and robotic device data 152) to facilitate the one or more robotic devices (e.g., robotic device 360 of FIG. 3) to move the one or more parcels or the one or more parcel containment units from or to the UAV, elevator apparatus, rotatable turntable, another location on the rooftop platform, another location within the building of the rooftop platform, or one or more combinations thereof.

For example, the one or more robotic devices may comprise one or more end effectors, and the robotic device management engine 150 may wirelessly communicate with the one or more robotic devices to control the one or more robotic devices. In some embodiments, the one or more end effectors may be mounted on one or more arms of a robotic device, wherein the one or more arms have one or more joints (e.g., a torsional joint, a flexure joint) for gripping or otherwise moving the one or more parcels or the one or more parcel containment units. In some embodiments, the one or more end effectors (e.g., a gripper, a magnet, a vacuum head, a sensor for part inspection, a sensor for vision guidance) can include a force sensor for detecting force, torque, or a combination thereof. In some embodiments, the one or more robotic devices include one or more motors. In some embodiments, the one or more robotic devices include one or more position sensors (e.g., an actuator position sensor), one or more encoder sensors (e.g., for detecting rotation angles of the one or more motors), one or more imaging sensors (e.g., a camera, a time of flight camera), an accelerometer, a gyroscope, a temperature sensor, a barometric pressure sensor, an ultraviolet sensor, an infrared sensor, an ultrasonic sensor, an altitude sensor, an odometer, a light radar component, another type of robotic device sensor, or one or more combinations thereof.

The robotic device data 152 may include motor rotation angle data, force data associated with a force sensor, location data associated with the one or more robotic devices, positioning data associated with the one or more end effectors, contact data corresponding to the one or more robotic devices and the one or more parcels or the one or more parcel containment units, accelerometer data, gyroscope data, image data, video data, temperature data, infrared data, ultraviolet data, barometric pressure data, other types of robotic device data, or one or more combinations thereof. The robotic device management engine 150 can receive and process the robotic device data 152 from the one or more robotic devices, and the robotic device management engine 150 may use the robotic device data 152 and the delivery data 114 to operate and control the one or more robotic devices. In some embodiments, the robotic device management engine 150 can include one or more servers for receiving robotic device data 152 associated with sensors that receive internal or external measurements associated with the environment of the one or more robotic devices, for example.

Further, the one or more robotic devices can include a Subscriber Identity Module, a modem, a mobile identification module, another type of module, or one or more combinations thereof. In some embodiments, the one or more robotic devices include a graphics processing unit, a central processing unit, another type of processor, or one or more combinations thereof. In some embodiments, the one or more robotic devices include one or more wheels for moving from or to the UAV, elevator apparatus, rotatable turntable, another location on the rooftop platform, another location within the building of the rooftop platform, or one or more combinations thereof. In some embodiments, the one or more robotic devices include one or more lights (e.g., an LED light).

The UAV rooftop delivery management system 110 can communicate with the user device 102 and the parcel tracking device 104 via the network 106 to facilitate a delivery or a retrieval of a parcel or a parcel containment unit to or from the rooftop platform. For example, the UAV rooftop delivery management system 110 can receive delivery data associated with the parcel or the parcel containment unit from the user device 102 or from a server, for example. The UAV rooftop delivery management system 110 can store and retrieve the delivery data 114 at database 112. For example, the stored delivery data 114 may include dimensions, weight, or material of the one or more parcels or the one or more parcel containment units; a delivery time or time range, a delivery date, a delivery location, a retrieval location, an intermediate delivery location of an entire delivery route, or one or more combinations thereof. In some embodiments, the stored delivery data 114 may include historical delivery data from past deliveries by a terrestrial vehicle, historical UAV sensor data from past deliveries, historical terrestrial vehicle traffic data associated with particular dates and times, historical UAV traffic data associated with particular dates and times, or one or more combinations thereof. The UAV rooftop delivery management system 110 can use the stored delivery data 114, delivery data received in real-time or near real-time, or one or more combinations thereof, to determine that the parcel or parcel containment unit is to be delivered to or retrieved from the rooftop platform.

In addition, the UAV rooftop delivery management system 110 can facilitate receipt of the parcel or parcel containment unit, from the UAV, by the rotatable turntable mounted to the rooftop platform. For example, the UAV rooftop delivery management system 110 can use delivery data 114 (e.g., received from the user device 102), data received from the parcel tracking device 104, UAV data 122, rotatable turntable data 142, or one or more combinations thereof to determine that the parcel or parcel containment unit was received by the rotatable turntable. Continuing the example, the UAV rooftop delivery management system 110 can receive sensor data from one or more sensors associated with the rotatable turntable (e.g., one or more pressure sensors, one or more fiber optic sensors, one or more temperature sensors, one or more accelerometers, one or more gyroscopic sensors, one or more inertial sensors, another type of sensor, or one or more combinations thereof), location data or positioning data from the parcel tracking device 104, UAV sensor data (e.g., images, videos, thermal readings, GPS data, radar data, sonar data, light detection and ranging data), or one or more combinations thereof, to determine that the parcel or parcel containment unit is secured by the rotatable turntable.

Additionally, the UAV rooftop delivery management system 110 can facilitate receipt of the parcel or parcel containment unit, from the rotatable turntable mounted to the rooftop platform, by the UAV. For example, the UAV rooftop delivery management system 110 can use delivery data 114 (e.g., received from the user device 102), data received from the parcel tracking device 104, UAV data 122, rotatable turntable data 142, or one or more combinations thereof to determine that the parcel or parcel containment unit was received by the UAV. Continuing the example, the UAV rooftop delivery management system 110 can determine, using sensor data from one or more sensors associated with the rotatable turntable (e.g., pressure data, weight data, image data, video data), location data or positioning data from the parcel tracking device 104, UAV sensor data (e.g., pressure data, weight data, image data, video data, GPS data, radar data, sonar data, light detection and ranging data), or one or more combinations thereof, to determine that the parcel or parcel containment unit has been received from rotatable turntable or to determine that the parcel or parcel containment unit has been received and secured by the UAV.

In addition, the UAV rooftop delivery management system 110 can facilitate receipt of the parcel or parcel containment unit, from the rotatable turntable mounted to the rooftop platform, by the elevator apparatus. For example, the UAV rooftop delivery management system 110 can use delivery data 114 (e.g., received from the user device 102), data received from the parcel tracking device 104, elevator apparatus data 132, rotatable turntable data 142, robotic device data 152, or one or more combinations thereof to determine that the parcel or parcel containment unit was received by the UAV. Continuing the example, the UAV rooftop delivery management system 110 can determine that the parcel or parcel containment unit has been received by the elevator apparatus, and can also determine that the parcel or parcel containment unit has been secured by a track located on the elevator apparatus. For instance, the UAV rooftop delivery management system 110 can use sensor data from one or more sensors associated with the elevator apparatus (e.g., pressure data, weight data, image data, video data, light detection and ranging data), location data or positioning data from the parcel tracking device 104, sensor data from one or more sensors associated with one or more tracks (e.g., pressure data, weight data, image data, video data), or one or more combinations thereof. Additionally or alternatively, the UAV rooftop delivery management system 110 can facilitate receipt of the parcel or parcel containment unit, from elevator apparatus, by the rotatable turntable mounted to the rooftop platform.

Further, the UAV rooftop delivery management system 110 can facilitate receipt of the parcel or parcel containment unit, from the rotatable turntable mounted to the rooftop platform, by the shelter unit. Additionally, the UAV rooftop delivery management system 110 can facilitate receipt of the parcel or parcel containment unit, from the shelter unit, by the rotatable turntable. For example, the UAV rooftop delivery management system 110 can use delivery data 114 (e.g., received from the user device 102), data received from the parcel tracking device 104, elevator apparatus data 132, rotatable turntable data 142, robotic device data 152, or one or more combinations thereof, to determine that the parcel or parcel containment unit was received by the UAV. In some embodiments, the UAV rooftop delivery management system 110 can use robotic device data 152 (e.g., gyroscope data, image data, video data, temperature data, infrared data, ultraviolet data, barometric pressure data, other types of robotic data, or one or more combinations thereof) to determine receipt of the parcel or parcel containment unit by the shelter unit. In some embodiments, the UAV rooftop delivery management system 110 can facilitate moving the parcel or parcel containment unit to the shelter unit via one or more robotic devices.

Rooftop Platform

FIG. 2 provides an example environment 200 for a rooftop platform 202 that facilitates receipt and delivery of a parcel containment unit 204 by a UAV 206. The rooftop platform 202 comprises a rotatable turntable 210 mounted to the rooftop platform 202, an elevator apparatus 220 at least partially accessible via the rooftop platform 202, a shelter unit 230, and a landing area 240 for the UAV 206 to deliver or receive the parcel containment unit 204 via the rotatable turntable 210. In some embodiments, the rooftop platform 202 has more than one rotatable turntable 210, more than one elevator apparatus 220, or more than one shelter unit 230.

The rotatable turntable 210 has one or more tracks for receiving track wheels of the parcel containment unit 204, and a plurality of tracks 212 adjacent to the rotatable turntable 210 can receive the track wheels of the parcel containment unit 204 from the rotatable turntable 210 based on a position of the rotatable turntable 210. For example, the elevator apparatus 220, the shelter unit 230, the landing area 240, another area of the rooftop platform 202, or one or more combinations thereof, can receive the parcel containment unit 204 from the tracks of the rotatable turntable 210 via the plurality of tracks 212. In some embodiments, the parcel containment unit 204 has one or more track wheels or one or more track components configured for the tracks on the rotatable turntable 210 to receive, secure, position, and move the parcel containment unit 204. In addition, the plurality of tracks 212 adjacent to the rotatable turntable 210 can receive, secure, position, and move the parcel containment unit 204 via the one or more track wheels or one or more track components. In some embodiments, the one or more track wheels or one or more track components (of the parcel containment unit 204) are coupled to a motor for propulsive force generation to move the parcel containment unit 204 across the plurality of tracks 212 adjacent to the rotatable turntable 210.

In some embodiments, the one or more track components of the parcel containment unit 204 (configured for the plurality of tracks 212 or the tracks on the rotatable turntable 210 to receive, secure, position, and move the parcel containment unit 204) comprise one or more magnetic components configured to magnetically lift the parcel containment unit 204 via an eddy current effect in conductive components of the plurality of tracks 212 or the tracks on the rotatable turntable 210. In embodiments, a magnetic field can be generated by a rotor with the one or more magnetic components that can be driven by a motor for moving the parcel containment unit 204 across the plurality of tracks 212 or the tracks on the rotatable turntable 210. For example, the rotor can be configured above a threshold velocity to cause the parcel containment unit 204 to raise above the conductive components of the plurality of tracks 212 or the tracks on the rotatable turntable 210, such that the parcel containment unit 204 hovers above the plurality of tracks 212 or the tracks on the rotatable turntable 210. In some embodiments, the parcel containment unit 204 has one or more magnets for facilitating the hovering above the plurality of tracks 212 or the tracks on the rotatable turntable 210. In some embodiments, the elevator apparatus comprises one or more magnets or conductive components to facilitate receipt of the parcel containment unit. For example, the one or more magnets or conductive components can be positioned under a floor covering of a lift cabin of the elevator apparatus 220. In embodiments, the conductive components can include non-ferromagnetic conductive metal (e.g., a thin sheet or a lattice or aluminum or copper). In some embodiments, the motor is coupled to the rotor to drive the rotor. In some embodiments, in addition to the one or more magnetic components, the parcel containment unit 204 may also include one or more wheels or rollers. In one example embodiment associated with the elevator apparatus 220 and parcel containment unit 204 having the one or more magnets or conductive components, the parcel containment unit 204 does not have wheels or rollers, and the elevator apparatus 220 does not have tracks for receiving the parcel containment unit 204.

In some embodiments, the parcel containment unit 204 has an actuator and the elevator apparatus 220 has one or more guiding strips. For example, the one or more guiding strips can be magnetic guiding strips. As another example, the actuator can be configured for moving the parcel containment unit 204 at one or more velocities to cause the parcel containment unit 204 to move along the plurality of tracks 212 or the tracks on the rotatable turntable 210 and to be guided by the one or more guiding strips of the elevator apparatus 220 as it moves into and out of the elevator apparatus 220. In some embodiments, the one or more guiding strips include a wire. In some embodiments, the elevator apparatus 220 also has one or more friction reducing devices affixed to the parcel containment unit 204.

In some embodiments, a first operation of the rotatable turntable 210 moves the parcel containment unit 204 via the tracks of the rotatable turntable 210 from an open position on the rotatable turntable 210 to a covered position within the shelter unit 230 via at least one of the plurality of tracks 212 positioned adjacent to the rotatable turntable 210. In some embodiments, a second operation of the rotatable turntable 210 moves the parcel containment unit 204 via the tracks of the rotatable turntable 210 in the open position to an interior position within a lift cabin of the elevator apparatus 220, wherein the lift cabin extends through a surface 226 of the rooftop platform 202. In some embodiments, a third operation comprises moving the parcel containment unit 204, via at least one of the plurality of tracks 212 positioned adjacent to the rotatable turntable 210, from the interior position within the lift cabin of the elevator apparatus 220 to an open position on the rotatable turntable 210. In some embodiments, a fourth operation comprises moving the parcel containment unit 204, via at least one of the plurality of tracks 212 positioned adjacent to the rotatable turntable 210, from the interior position within the shelter unit 230 to an open position on the rotatable turntable 210.

In addition, the elevator apparatus 220 has a lift frame 222 of the lift cabin, wherein the lift frame 222 extends through the surface 226 of the rooftop platform 202. Further, the elevator apparatus 220 has an upper pulley support structure 224 located at a height above the landing area 240 and the surface 226 of the rooftop platform 202. Furthermore, the elevator apparatus 220 is capable of supporting the parcel containment unit 204. As such, another operation of the rotatable turntable 210 comprises moving the parcel containment unit 204 via the tracks of the rotatable turntable 210 from a first location on the rotatable turntable to a second location within the lift cabin of the elevator apparatus 220. In embodiments, the UAV rooftop delivery management system 110 of FIG. 1 facilitates the operations of the UAV 206, the rotatable turntable 210, the elevator apparatus 220, the shelter unit 230, and the plurality of tracks 212 adjacent to the rotatable turntable 210.

In some embodiments, the rooftop platform 202 can determine that the parcel containment unit 204 is positioned within the lift cabin of the elevator apparatus 220 (e.g., determined by the UAV rooftop delivery management system 110 of FIG. 1). For example, this determination can be made based on at least one sensor associated with the elevator apparatus 220 (e.g., an imaging sensor, a thermal sensor, a weight sensor, a motion sensor). Additionally or alternatively, this determination can be made using the database 112 of FIG. 1, the parcel tracking device 104 of FIG. 1, or one or more combinations thereof. In some embodiments, this determination can also be made based on sensor data corresponding to at least one of the plurality of tracks 212 or the tracks on the rotatable turntable 210 (e.g., one or more pressure sensors, one or more fiber optic sensors, one or more temperature sensors, one or more accelerometers, one or more gyroscopic sensors, one or more inertial sensors, another type of track sensor, or one or more combinations thereof). As such, based on determining that the parcel containment unit 204 is positioned within the lift cabin of the elevator apparatus 220, the rooftop platform 202 can move the lift cabin of the elevator apparatus 220 to a particular floor 252 located within a building 250 under the rooftop platform 202 for delivery of a parcel from the parcel containment unit 204.

Figure 3:
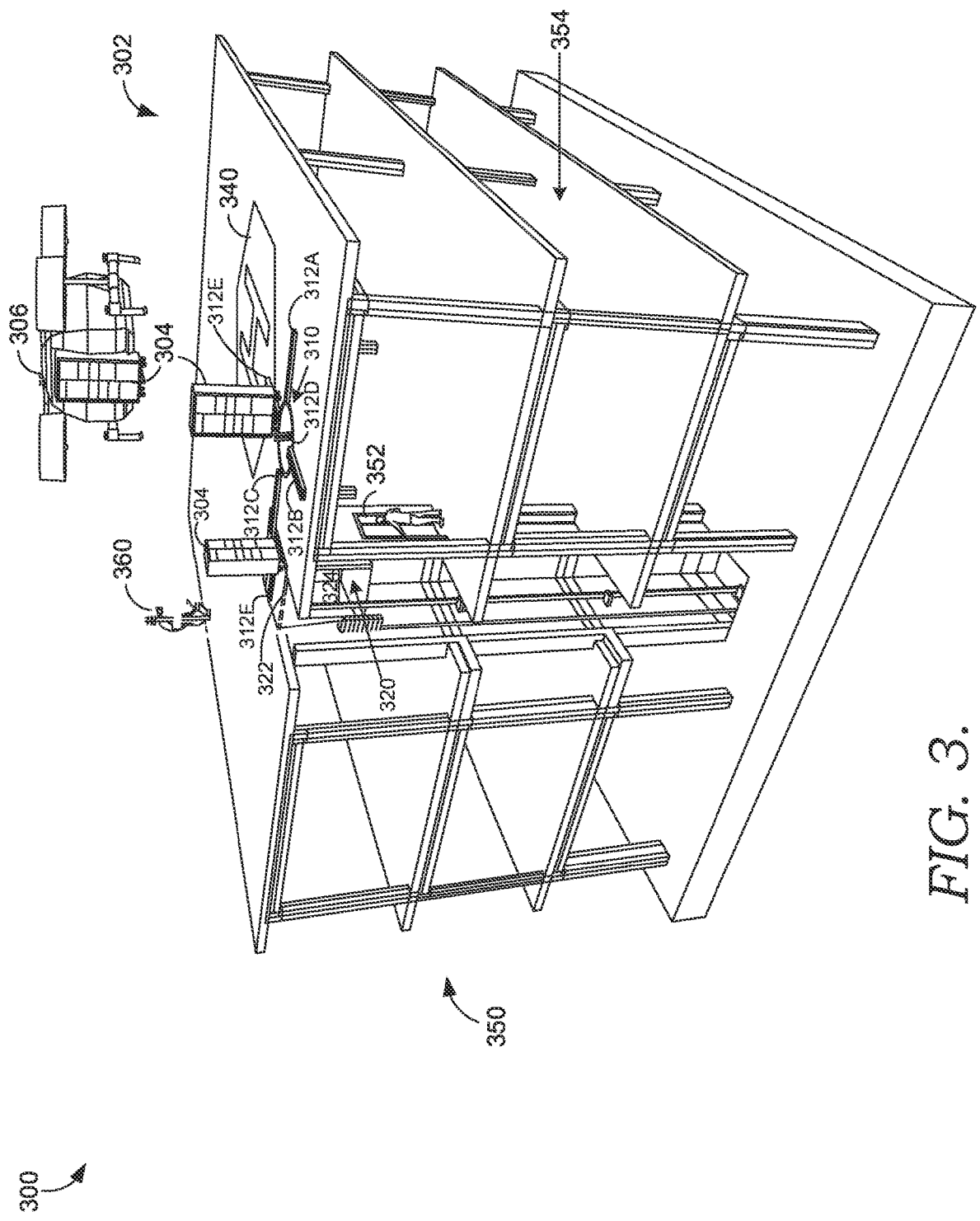
FIG. 3 is another example environment of the rooftop platform, in accordance with embodiments described herein.

FIG. 3 provides another example environment 300 of a rooftop platform 302 that facilitates receipt and delivery of a parcel containment unit 304 by a UAV 306. The rooftop platform 302 comprises a rotatable turntable 310 mounted to the rooftop platform 302, an elevator apparatus 320 at least partially accessible via the rooftop platform 302, a landing area 340 for the UAV 306 to deliver or retrieve the parcel containment unit 304 via the rotatable turntable 310, and a robotic device 360. In some embodiments, the rooftop platform 302 has more than one rotatable turntable 310, more than one elevator apparatus 320, more than one landing area 340, or more than one robotic device 360.

In example environment 300, the rotatable turntable 310 has tracks 312D for receiving track wheels of the parcel containment unit 304, and a plurality of tracks 312A, 312B, 312C, and 312E adjacent to the rotatable turntable 310. Tracks 312A, 312B, 312C, 312D, and 312E can receive track wheels or one or more track components of the parcel containment unit 304 from the rotatable turntable 310 based on a position of the rotatable turntable 310. For example, the elevator apparatus 320 that is at least partially accessible via the rooftop platform 302, the landing area 340, another area of the rooftop platform 302, or one or more combinations thereof, can receive the parcel containment unit 304 from the tracks 312D of the rotatable turntable 310 via the plurality of tracks 312A, 312B, 312C, and 312E. In addition to receiving the parcel containment unit 304, the plurality of tracks 312A, 312B, 312C, and 312E adjacent to the rotatable turntable 310 can additionally secure, position, and move the parcel containment unit 304 via one or more track wheels or one or more track components coupled to the parcel containment unit 304.

In example environment 300, the elevator apparatus 320 is at least partially accessible via the rooftop platform 302 from a top surface 322 of a lift cabin 324 of the elevator apparatus 320. In example environment 300, the top surface 322 of the lift cabin 324 is capable of supporting the parcel containment unit 304. In addition, the top surface 322 of the lift cabin 324 of the elevator apparatus 320 has tracks 312F adjacent to the tracks 312C, and the tracks 312F can also receive the parcel containment unit 304 from the tracks 312C. Further, tracks 312F can secure, position, and move the parcel containment unit 304 via one or more track wheels or one or more track components coupled to the parcel containment unit 304. In embodiments, an operation of the rooftop platform 302 includes moving the parcel containment unit 304 via the tracks 312D from a location on the rotatable turntable 310, to another location on the tracks 312C, and yet to another location above the lift cabin 324 on tracks 312F. As such, the top surface 322 of a lift cabin 324 of the elevator apparatus 320 can receive the parcel containment unit 304, comprising one or more parcels, on the elevator apparatus 320 at a top surface 322 from the rotatable turntable 310.

In one example embodiment, the lift cabin 324 of the elevator apparatus 320 has a portion dedicated for the parcel containment unit 304 and another portion dedicated to human or robotic passengers. For example, the lift cabin 324 of the elevator apparatus 320 may have an exit/entry door for the portion dedicated to the parcel containment unit 304 and another exit/entry door for the portion dedicated to the human or robotic passenger. Continuing the example, an automatic storage and retrieval system can retrieve parcels from the parcel containment unit 304 from the portion of the lift cabin 324 dedicated to the parcel containment unit 304 via the exit/entry door for that portion. As another example, a human or robotic recipient can retrieve the parcels from the parcel containment unit 304 from the portion of the lift cabin 324 via the corresponding exit/entry door. In some aspects, the exit/entry door for the parcel containment unit 304 is located directly across from the exit/entry door for the human or robotic passenger.

In another example embodiment, the elevator apparatus 320 has a first lift cabin and a second lift cabin, the first lift cabin for the human or robotic passenger and the second lift cabin for the parcel containment unit 304, one or more parcels, or another type of parcel containing unit. Continuing the example, in some embodiments, the second lift cabin for the parcel containment unit 304 replaces an elevator counterweight of the elevator apparatus 320. In some embodiments, an elevator cable of the elevator apparatus 320 that corresponds to the first lift cabin, the second lift cabin, or a combination thereof, can be individually controlled via a cable driving motor. In some embodiments, an elevator cable corresponding to the first lift cabin and an elevator cable corresponding to the second lift cabin can be simultaneously actuated by the cable drive motor.

In some embodiments, the rooftop platform 302 can determine that the parcel containment unit 304 is positioned on the top surface 322 of the lift cabin 324 of the elevator apparatus 320 (e.g., determined by the UAV rooftop delivery management system 110 of FIG. 1). For example, this determination can be made based on at least one sensor associated with the top surface 322 (e.g., an imaging sensor of the robotic device 360 or an imaging sensor on the top surface 322 (e.g., on tracks 312F), a thermal sensor on the top surface 322 or on the tracks 312F, a weight sensor on the tracks 312F or elsewhere on the elevator apparatus 320, a motion sensor of the robotic device 360 or on the top surface 322). Additionally or alternatively, this determination can be made using the database 112 of FIG. 1, the parcel tracking device 104 of FIG. 1, or one or more combinations thereof. As such, based on determining that the parcel containment unit 304 is positioned on the top surface 322, the rooftop platform 202 can move the lift cabin 324 of the elevator apparatus 320 to move to a particular floor 354 located within a building 350 under the rooftop platform 302 for delivery of a parcel from the parcel containment unit 304. Accordingly, in embodiments wherein the top surface 322 of a lift cabin 324 of the elevator apparatus 320 receives the parcel containment unit 304 (e.g., at tracks 312F), the rooftop platform 302 can cause the lift cabin 324 of the elevator apparatus 320 to move towards a particular floor 354, such that the parcel containment unit 304 is accessible at 352 within a building 350 of the rooftop platform 302 for delivery of a parcel, from the parcel containment unit 304.

In some embodiments, a parcel from the parcel containment unit 304 or the parcel containment unit 304 itself can be retrieved by the robotic device 360. For example, the robotic device 360 can autonomously or semi-autonomously receive the parcel containment unit 304 (e.g., using one or more end effectors mounted on one or more arms of the robotic device 360) from the rooftop platform 302, from a floor within the building 350, from the rotatable turntable 310, from the elevator apparatus 320, from the landing area 340, from the UAV 306, or one or more combinations thereof. In some embodiments, the parcel containment unit 304 or a parcel from the parcel containment unit 304 can be received, using the robotic device 360, at the rooftop platform 302, at a floor within the building 350, by a person on the floor within the building 350, at the rotatable turntable 310, at the elevator apparatus 320, at the landing area 340, at the UAV 306, or one or more combinations thereof.

Figure 4:
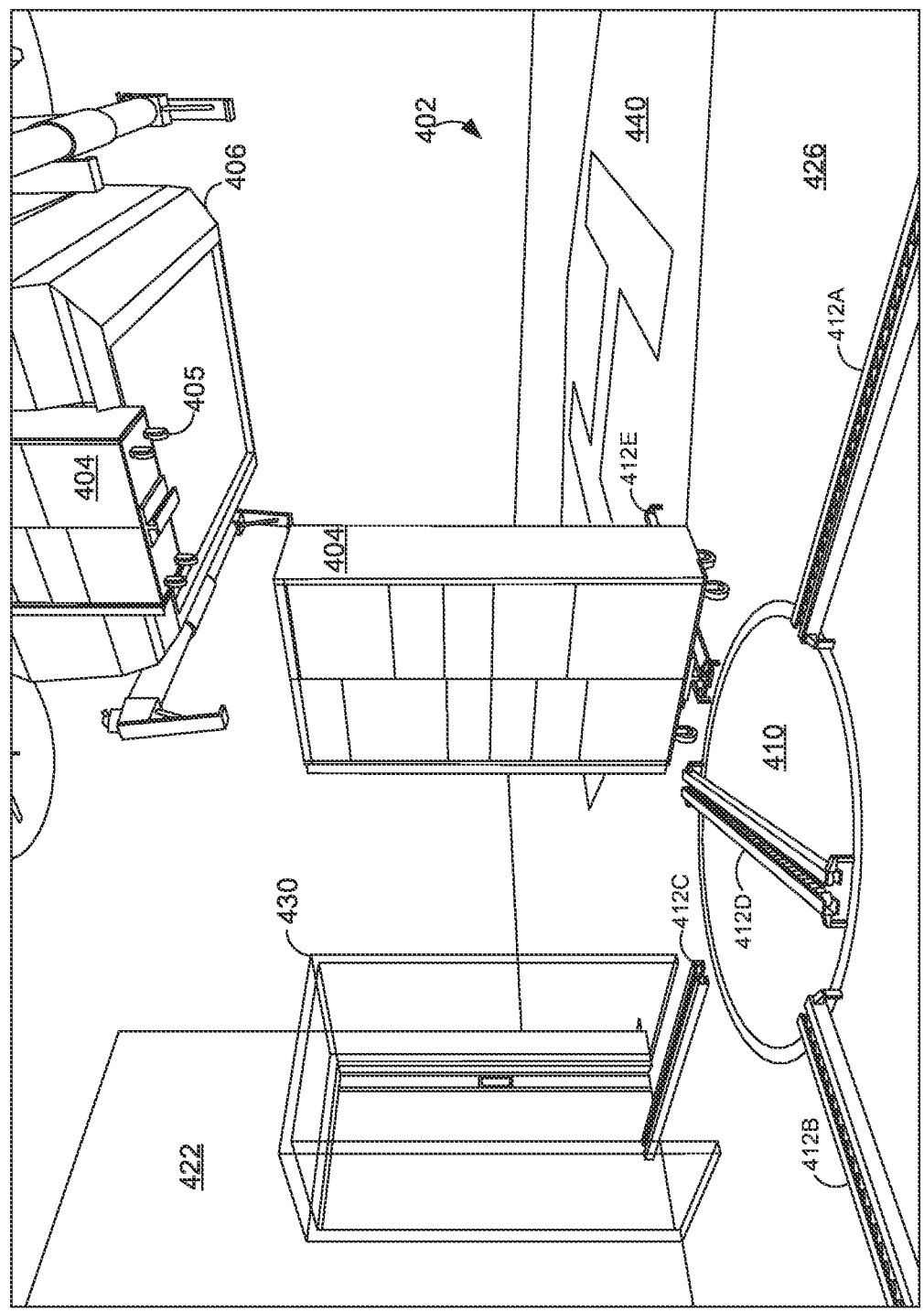
FIG. 4 is an example environment of the rooftop platform for receipt or delivery of a parcel containment unit using a rotatable turntable of the rooftop platform and a UAV, in accordance with embodiments described herein.

FIG. 4 depicts example environment 400 of rooftop platform 402 for receipt or delivery of a parcel containment unit 404 using a rotatable turntable 410 and UAV 406 of the rooftop platform 402. The rooftop platform 402 comprises a rotatable turntable 410 mounted to the rooftop platform 402, the rotatable turntable 410 having tracks 412D on the rotatable turntable 410 and tracks 412A, 412B, 412C, and 412E that are adjacent to the rotatable turntable 410. For example, tracks 412C extend from the rotatable turntable 410 to landing area 440 of the rooftop platform 402 and tracks 412E extend from the rotatable turntable 410 to shelter unit 430 of the rooftop platform 402. As such, the rooftop platform 402 also comprises the shelter unit 430 that is secured to a portion of an elevator apparatus (e.g., a lift frame 422 of the elevator apparatus, wherein the lift frame 422 extends above a surface 426 of the rooftop platform 402), and the landing area 440 for the UAV 406 to deliver the parcel containment unit 404 via the rotatable turntable 410.

In some embodiments, prior to the elevator apparatus (e.g., corresponding to the lift frame 422) receiving a parcel or the parcel containment unit 404, the parcel containment unit 404 is received, from the rotatable turntable 410 via the tracks 412D mounted to the rotatable turntable 410, at the shelter unit 430 secured to the lift frame 422. In some embodiments, one or more parcels are positioned within a locker of the parcel containment unit 404, and the parcel containment unit 404 also has track wheels 405 that can be secured by the tracks 412D of the rotatable turntable 410. In another embodiment, the shelter unit 430 can receive the parcel containment unit 404 from the rotatable turntable 410 prior to the elevator apparatus receiving the parcel containment unit 404 at the top surface of the lift cabin of the elevator apparatus. In embodiments, the rotatable turntable 410 can subsequently receive the parcel containment unit 404 from the shelter unit 430 after a period of time based on the delivery data 114 of FIG. 1, for example. Additionally or alternatively, the period of time that the parcel containment unit remains at the shelter unit 430 may be based on weather data received by the rooftop platform 402. In response to the rotatable turntable 410 subsequently receiving the parcel containment unit 404 from the shelter unit 430, the elevator apparatus can receive the parcel containment unit 404 from the rotatable turntable 410.

Figure 5:
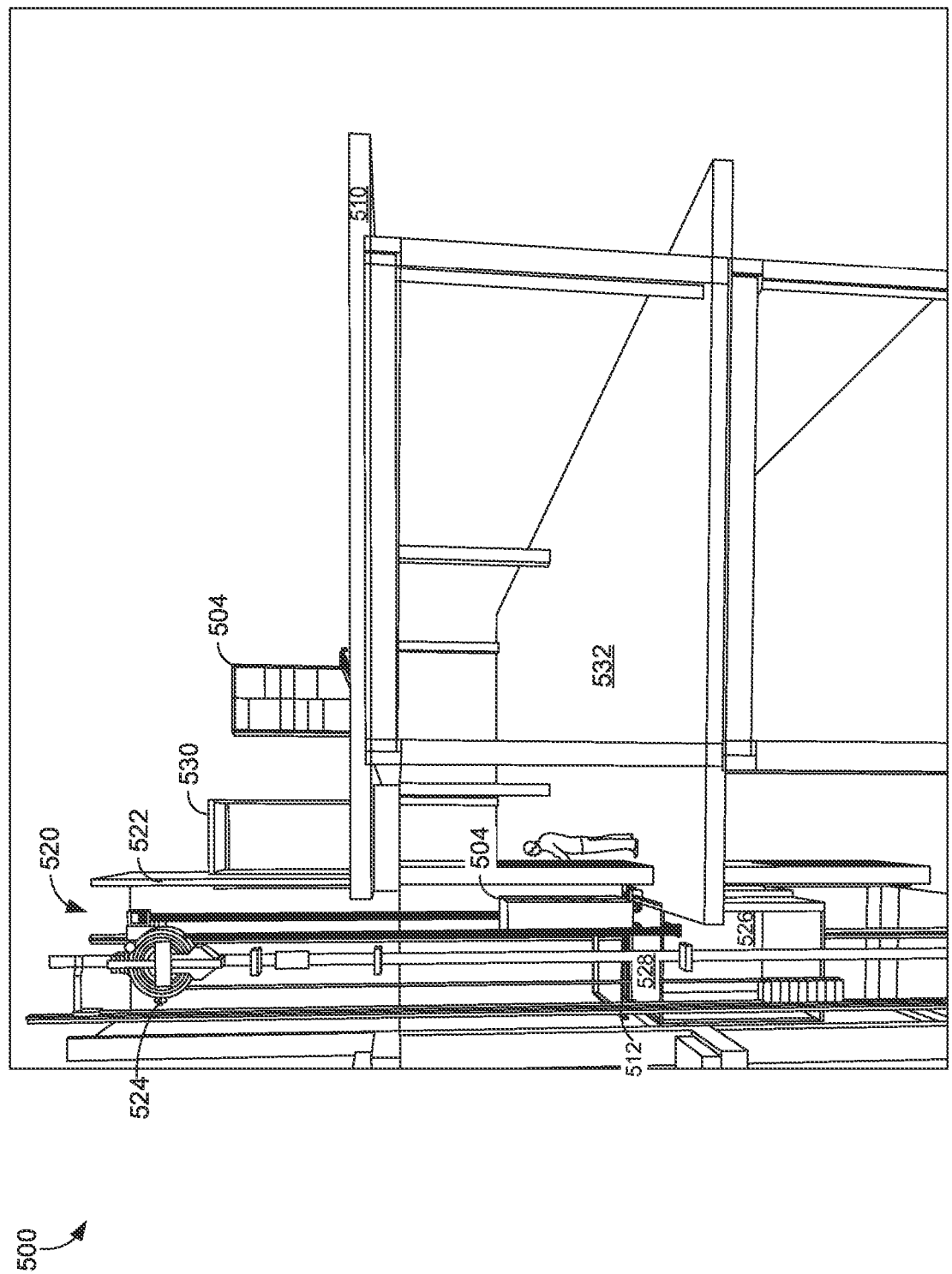
FIG. 5 illustrates an example environment for delivery or retrieval of a parcel, via the parcel containment unit, to a particular floor within a building under the rooftop platform using an elevator apparatus corresponding to the rooftop platform, in accordance with embodiments described herein.

FIG. 5 illustrates an example environment 500 for delivery or retrieval of a parcel, via parcel containment unit 504, to a particular floor 532 within a building under the rooftop platform having an elevator apparatus 520 and a shelter unit 530. The elevator apparatus 520 has a lift frame 522 and an upper pulley support structure 524 located at a height above the surface 510 of the rooftop platform. The lift frame 522 extends above the surface 510 of the rooftop platform. Further, the shelter unit 530 is positioned against the lift frame 522 of the elevator apparatus 520. In other embodiments, the shelter unit is positioned at a distance from the elevator apparatus 520.

In some embodiments, the rooftop platform of example environment 500 can determine that the elevator apparatus 520 has received a parcel or a parcel containment unit 504. In embodiments, the elevator apparatus 520 can receive the parcel or parcel containment unit 504 at tracks 512 on a top surface 528 of a lift cabin 526 of the elevator apparatus 520. In other embodiments, the elevator apparatus 520 can receive the parcel or parcel containment unit 504 at tracks within the lift cabin 526 of the elevator apparatus 520, for example.

In some embodiments, the rooftop platform of example environment 500 can determine that the elevator apparatus 520 has received a parcel or a parcel containment unit 504 using at least one sensor associated with the elevator apparatus 520. For example, the sensor associated with the elevator apparatus may include a sensor of a robotic device or a user device, such as an imaging sensor (e.g., for receiving image data or video data) or motion sensor that monitors the elevator apparatus 520 or a portion thereof. In some embodiments, the sensor associated with the elevator apparatus 520 includes a sensor corresponding to an Internet of Things device (e.g., a temperature sensor, a light detection and ranging sensor). In some embodiments, the sensor associated with the elevator apparatus 520 is a sensor located on an interior portion of a lift cabin 526 of the elevator apparatus 520 (e.g., an imaging sensor, a thermal sensor, a weight sensor on a location of the elevator apparatus 520 that receives the parcel or parcel containment unit 504, a motion sensor).

Based on the delivery data (e.g., delivery data 114 of FIG. 1), the sensor data associated with the elevator apparatus 520, other data (e.g., data from database 112 of FIG. 1), or one or more combinations thereof, the lift cabin 526, having the parcel or the parcel containment unit 504, can be moved such that the parcel containment unit 504 is accessible at 532. In yet another embodiment, based on the delivery data (e.g., delivery data 114 of FIG. 1), the sensor data associated with the elevator apparatus 520, other data (e.g., data from database 112 of FIG. 1), or one or more combinations thereof, the lift cabin 526 having the parcel or the parcel containment unit 504 can be moved via the elevator apparatus 520 to the top of the building, such that the parcel or parcel containment unit 504 is accessible from the rooftop platform for subsequent retrieval by an aerial vehicle (e.g., a UAV).

Figure 6:
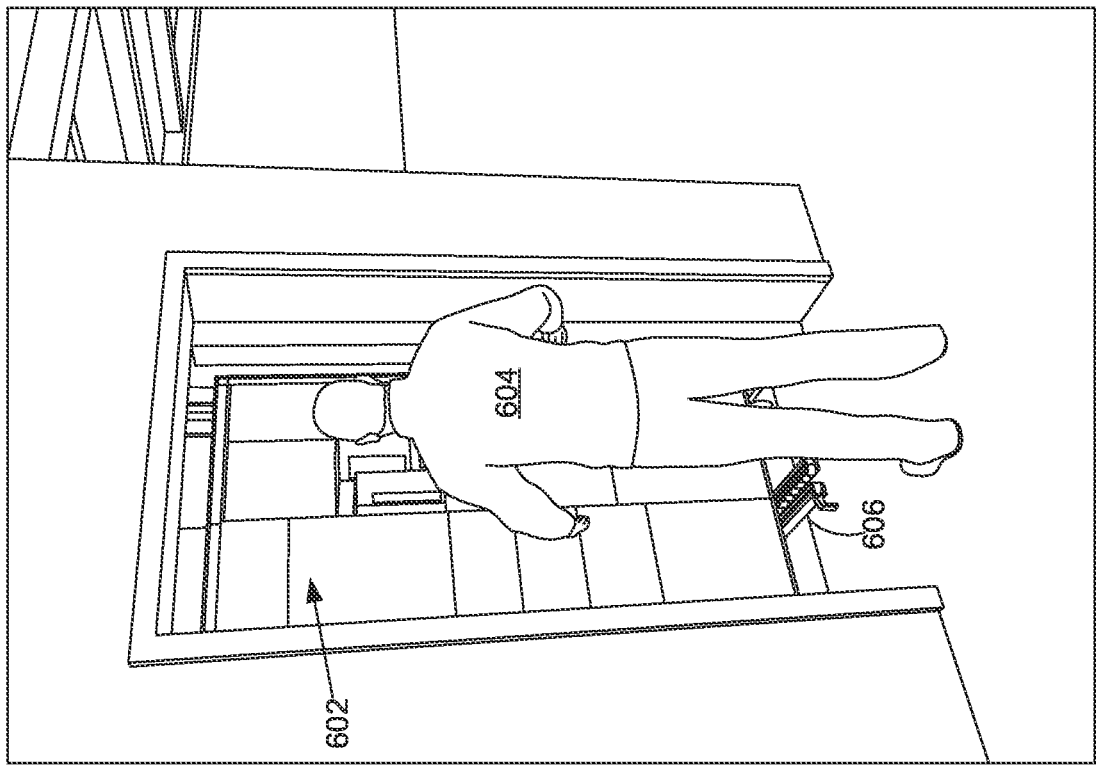
FIG. 6 illustrates an example environment for delivery or retrieval of the parcel to the particular floor, in accordance with embodiments described herein.

FIG. 6 illustrates an example environment 600 for delivery or retrieval of a parcel or a parcel containment unit 602 from or to a particular floor. For example, a parcel may be inserted into the parcel containment unit 602, by a human 604 or a robotic device (e.g., robotic device 360 of FIG. 3). For example, the parcel may be inserted or removed from the parcel containment unit 602 at one of a plurality of lockers. As another example, an automatic storage and retrieval system can manage the parcels inside the lockers of the containment unit 602. In some embodiments, each of the plurality of lockers has a locking system. In some embodiments, human 604 can use a user device to unlock one or more of the plurality of lockers via a unique QR code displayed on an interface of the user device. In some embodiments, the QR code is generated based on delivery data 114 of FIG. 1. In other embodiments, human 604 can use a user device to unlock one or more of the plurality of lockers using a manual and unique key or by using a numerical, alphanumerical, or another type of character code received via a user device and generated based on delivery data 114 of FIG. 1.

In some embodiments, the parcel containment unit 602 has track wheels (e.g., track wheels 405 of FIG. 4) or one or more track components that are secured by the tracks 606 of the elevator apparatus. For example, the tracks 606 of the elevator apparatus can be coupled to a bottom portion of a lift cabin of the elevator apparatus. In some embodiments, the track wheels or one or more track components of the parcel containment unit 602 comprise one or more magnetic components configured to magnetically lift the parcel containment unit 602 via an eddy current effect in conductive components of the tracks 606 of the elevator apparatus. Continuing the example, a magnetic field can be generated by a rotor with the one or more magnetic components that can be driven by a motor for moving the parcel containment unit 602 across the tracks 606 of the elevator apparatus. As such, the rotor can be configured to cause the parcel containment unit 602 to raise above the conductive components of the tracks 606 of the elevator apparatus, such that the parcel containment unit 602 hovers above the tracks 606 of the elevator apparatus.

Example Flow Charts

Figure 7:
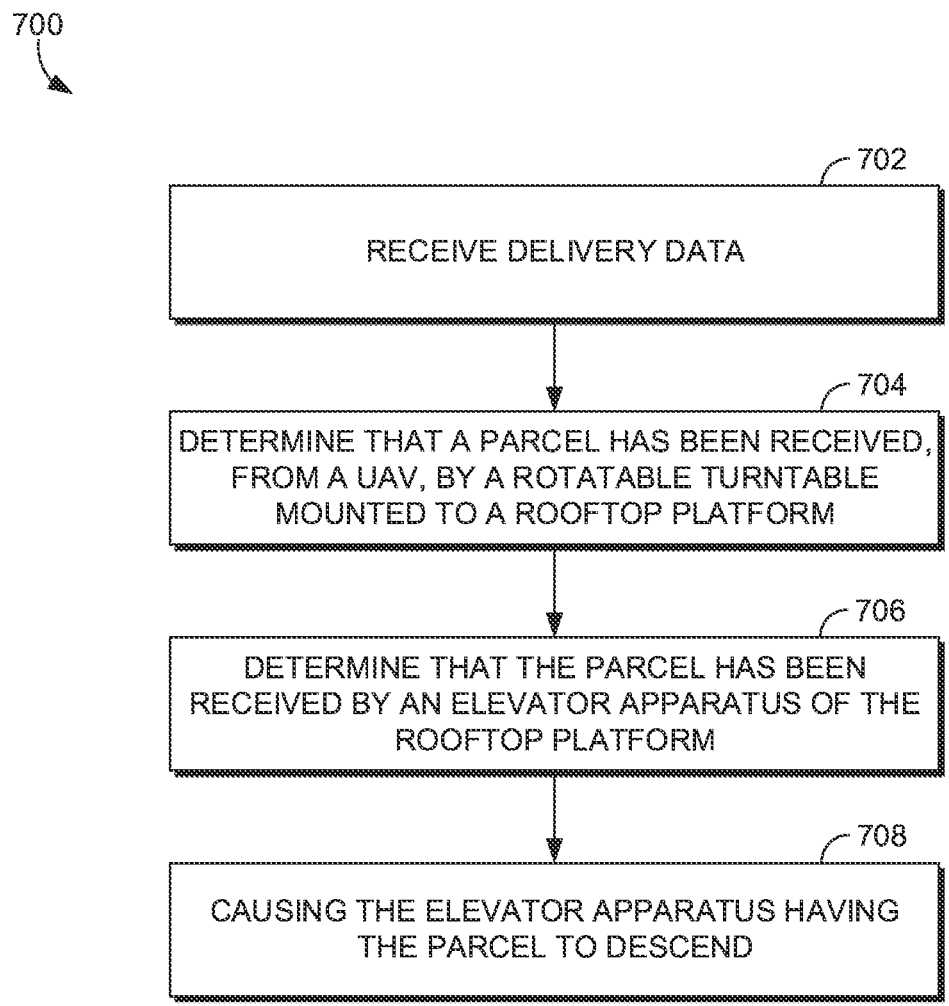
FIG. 7 illustrates an example flowchart for delivering a parcel to a rooftop platform, in accordance with embodiments described herein.

FIG. 7 provides an example flowchart 700 for delivering a parcel (e.g., via a parcel containment unit) to a rooftop platform having an elevator apparatus and rotatable turntable. In some embodiments, the elevator apparatus has a lift frame extending through a surface of the rooftop platform. At 702, delivery data associated with the parcel is received (e.g., by a user device). At 704, based at least in part on the delivery data, it is determined, via at least one sensor, that the parcel or parcel containment unit has been received, from an aerial vehicle (e.g., a UAV, a heavy lift UAV), by the rotatable turntable, wherein the elevator apparatus is at least partially accessible via the rooftop platform. In some embodiments, prior to determining the parcel or parcel containment unit has been received by the rotatable turntable, it is determined that the parcel is to be delivered to the rooftop platform (e.g., based on the delivery data 114 of FIG. 1). Furthermore, in some embodiments, it is also determined that the parcel or parcel containment unit is secured by the rotatable turntable. As one example, the parcel containment unit can be secured by the rotatable turntable via track wheels of the parcel containment unit and at least one track of the rotatable turntable.

At 706, it is determined that the parcel or parcel containment unit is received by the elevator apparatus. For example, in some embodiments, the rotatable turntable rotates to position the parcel or parcel containment unit on the elevator apparatus. In some embodiments, the parcel or parcel containment unit is received on the elevator apparatus at a top surface of a lift cabin of the elevator apparatus. Additionally, the at least one sensor associated with the elevator apparatus is used to determine that the parcel or the parcel containment unit is positioned within the lift cabin of the elevator apparatus.

At 708, the elevator apparatus having the parcel (e.g., in the parcel containment unit) is caused to descend from the rooftop platform. For example, based on the delivery data (e.g., delivery data 114 of FIG. 1), the lift cabin of the elevator apparatus is moved to a particular floor located within a building under the rooftop platform for delivery of the parcel from the parcel containment unit. In some embodiments, at least one sensor associated with the parcel containment unit is used to determine the parcel has been retrieved from the parcel containment unit. For example, it can be determined that the parcel has been retrieved (e.g., by human 604 of FIG. 6 or by robotic device 360 of FIG. 3) from the parcel containment unit based in part on a user device unlocking one or more of the plurality of lockers of the parcel containment unit.

Figure 8:
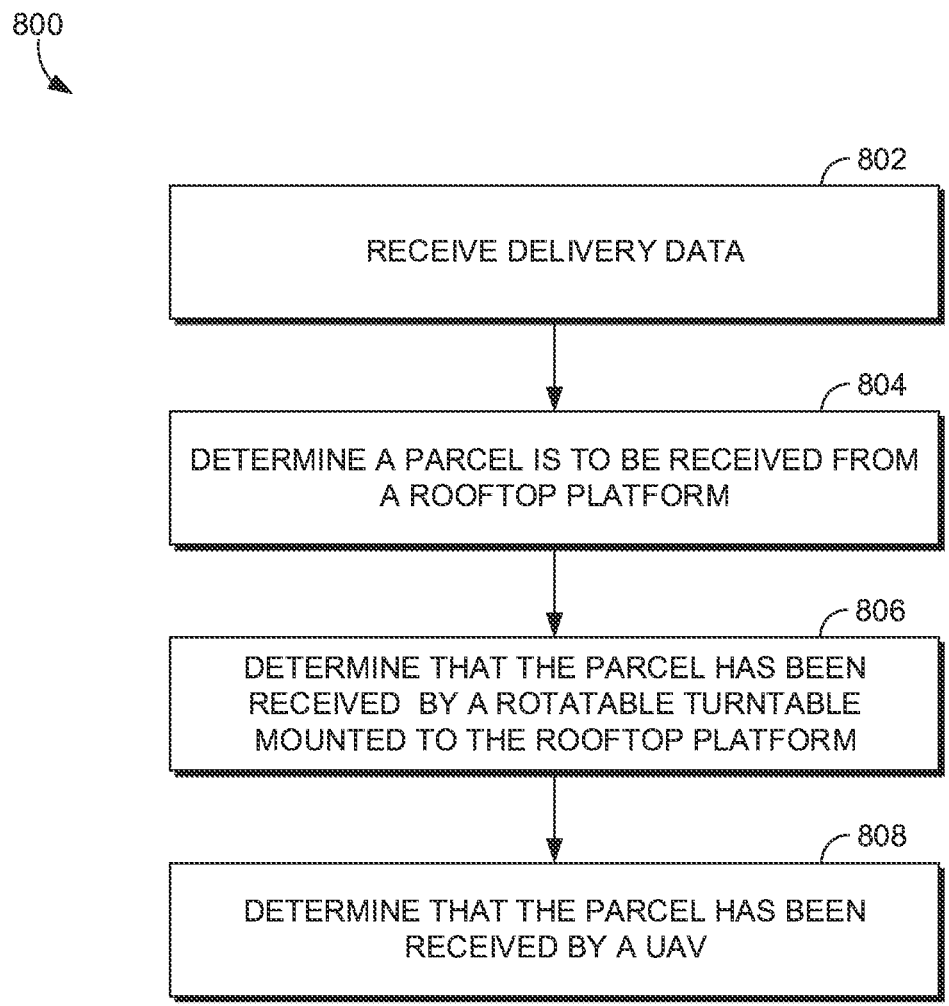
FIG. 8 illustrates another example flowchart for receiving a parcel from a rooftop platform, in accordance with embodiments described herein.

FIG. 8 provides an example flowchart 800 for receiving a parcel (e.g., via a parcel containment unit) from a rooftop platform having an elevator apparatus and rotatable turntable. At 802, delivery data (e.g., delivery data 114 of FIG. 1) associated with the parcel is received (e.g., by a user device or server). At 804, based at least in part on the delivery data, it is determined, via at least one sensor, that the parcel or parcel containment unit is to be received from the rooftop platform. At 806, it is determined that the parcel or parcel containment unit has been received by the rotatable turntable mounted to the rooftop platform. In some embodiments, the For example, the rotatable turntable receives the parcel or parcel containment unit from the elevator apparatus. The rooftop platform can facilitate the retrieval of the parcel or parcel containment unit by the rotatable turntable based on rotatable turntable data 142 of FIG. 1. Continuing the example, the rotatable turntable can have tracks for receiving the one or more parcels or the one or more parcel containment units. Further, it can be determined (e.g., by UAV rooftop delivery management system 110 of FIG. 1) that the parcel or parcel containment unit is secured by the rotatable turntable.

At 808, it is determined that the parcel has been received by the UAV from the rooftop platform (e.g., from the rotatable turntable or another area on the rooftop platform). In some embodiments, the UAV receives the parcel or parcel containment unit based on the rooftop platform rotating the rotatable turntable to position the parcel for receipt by the UAV. In some embodiments, it is determined that the parcel has been received by the UAV based in part on the UAV data 122 of FIG. 1. Additionally or alternatively, it is determined that the parcel has been received by the UAV based in part on the rotatable turntable data 142 of FIG. 1. In some embodiments, it is determined that the parcel has been received by the UAV based in part on the parcel tracking device 104 of FIG. 1.

Example UAV System

Figure 9:
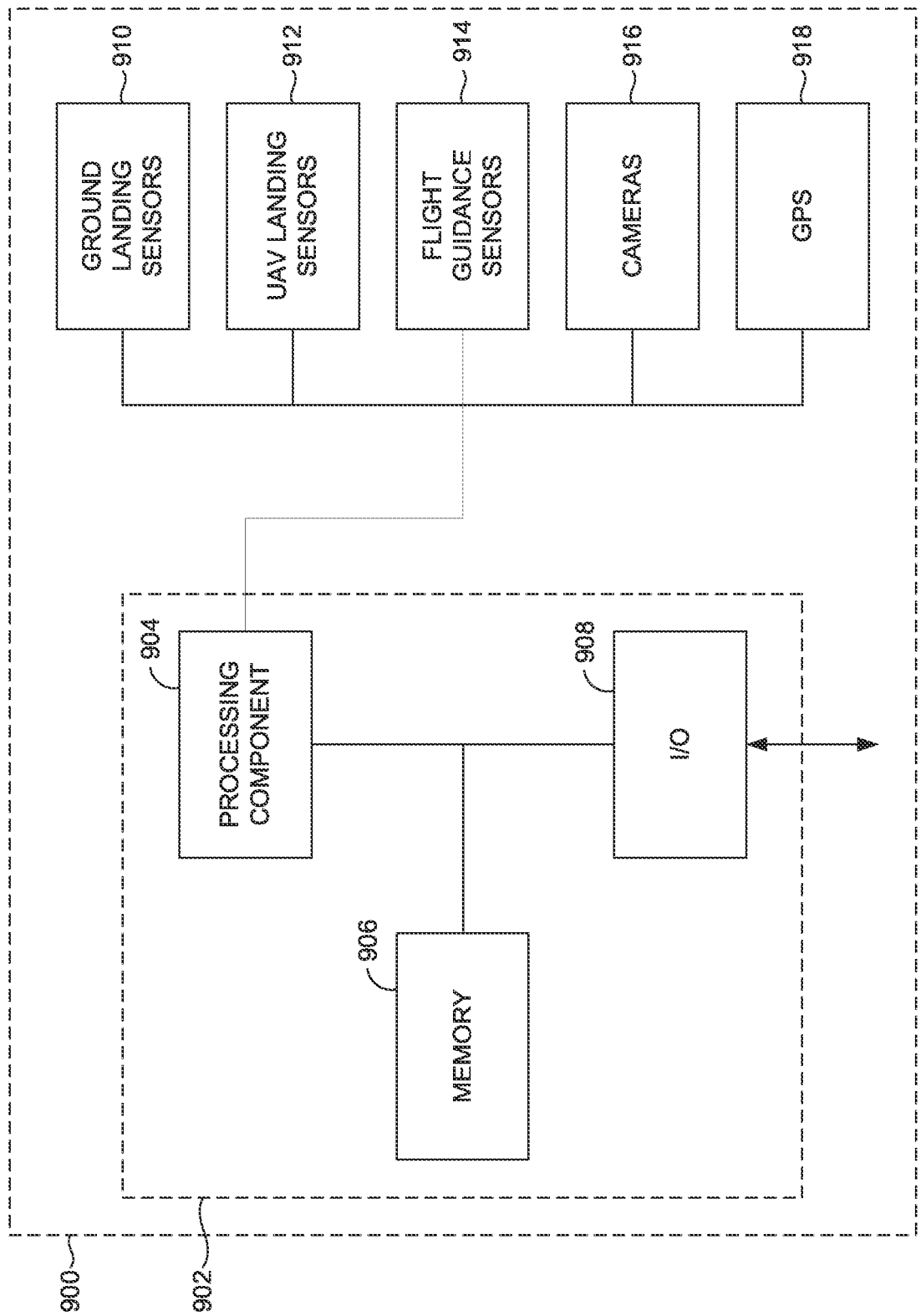
FIG. 9 illustrates an example UAV system, in accordance with embodiments described herein.

Having described the example embodiments discussed above of the presently disclosed technology, an example UAV system (e.g., UAV management engine 120 of FIG. 1) for facilitating delivery or retrieval from a rooftop platform is described below with respect to FIG. 9. Example UAV system 900 is but one example of a suitable UAV system, and is not intended to suggest any particular limitation as to the scope of use or functionality of the technology disclosed. Neither should UAV system 900 be interpreted as having any dependency or requirement relating to any particular component illustrated, or a particular combination of the components illustrated in FIG. 9.

The example UAV system 900 includes a UAV computing unit 902 having a processing component 904 (e.g., the one or more processors 1006 of FIG. 10), a memory 906 (e.g., memory 1004 of FIG. 10), and an input/output port 908 (e.g., I/O port 1010 of FIG. 10). The UAV computing unit 902 can use sensor data from the UAV sensors (e.g., ground landing sensors 910, UAV landing sensors 912, flight guidance sensors 914, cameras 916, and GPS 918) to detect objects within the UAV environment and to assist in guiding the UAV during flight, landing, and takeoff, for example.

In embodiments, the ground landing sensors 910 are configured to detect a distance between the UAV and one or more surfaces within a line of sight of the ground landing sensors 910. For example, the ground landing sensors 910 can detect a distance between the UAV and the rooftop platform, a distance between the UAV and a rotatable turntable on the rooftop platform, a distance between the UAV and an elevator apparatus on the rooftop platform, a distance between the UAV and a shelter unit on the rooftop platform, a distance between the UAV and a UAV landing area on the rooftop platform, a distance between the UAV and an object or human on the rooftop platform, or one or more combinations thereof. In some embodiments, the ground landing sensors 910 can include one or more SONAR sensors, LIDAR sensors, IR-Lock sensors, infrared distance sensors, ultrasonic distance sensors, magnetic-field sensors, RADAR sensors, another type of ground landing sensor, or one or more combinations thereof. In addition, the UAV can use the GPS 918 or another type of location sensor to detect a current location of the UAV relative to the rooftop platform, the UAV landing area, the elevator apparatus, the rotatable turntable, the shelter unit, the object, the human, or one or more combinations thereof.

In embodiments, the UAV landing sensors 912 may include one or more cameras (e.g., video cameras, still cameras), one or more altitude sensors (e.g., Light Detection and Ranging (LIDAR) sensors, laser-based distance sensors, infrared distance sensors, ultrasonic distance sensors, optical sensors, other types of UAV landing sensors, or one or more combinations thereof). In some embodiments, the UAV landing sensors 912 can be located on a portion of a chassis of the UAV. In embodiments, the cameras 916 may include a video or a still camera. In some embodiments, the cameras 916 can capture images or videos of the UAV during parcel or parcel containment unit delivery or retrieval at the rooftop platform.

In embodiments, the flight guidance sensors 914 may include LIDAR, LiDAR, LADAR, SONAR, magnetic-field sensors, RADAR sensors, another type of flight guidance sensor, or one or more combinations thereof. The flight guidance sensors 914 may be configured to "sense and avoid" objects that the UAV may encounter during flight. For example, the flight guidance sensors 914 may be configured to detect a parcel, a parcel containment unit, a rooftop platform, an elevator apparatus, a landing area, a shelter unit, a rotatable turntable, or one or more combinations thereof, such that the UAV may determine an appropriate flight path.

Additionally, the UAV system 900 can provide data for determining that the parcel has been received, from the UAV, at the rotatable turntable mounted to the rooftop platform. Additionally or alternatively, the UAV system 900 can provide data for determining that the parcel has been received, from the rotatable turntable mounted to the rooftop platform, by the UAV. In addition, the UAV system 900 can provide data for determining the parcel is secured by the rotatable turntable. Further, the UAV system 900 can provide data for determining the parcel has been received by the elevator apparatus. Furthermore, the UAV system 900 can provide data for determining the parcel has been received by a shelter unit on the rooftop platform.

Example User Device

Having described the example embodiments discussed above of the presently disclosed technology, an example operating environment of an example user device (e.g., user device 102 of FIG. 1) is described below with respect to FIG. 10. User device 1000 is but one example of a suitable computing environment, and is not intended to suggest any particular limitation as to the scope of use or functionality of the technology disclosed. Neither should user device 1000 be interpreted as having any dependency or requirement relating to any particular component illustrated, or a particular combination of the components illustrated in FIG. 10.

As illustrated in FIG. 10, example user device 1000 includes a bus 1002 that directly or indirectly couples the following devices: memory 1004, one or more processors 1006, one or more presentation components 1008, one or more input/output (I/O) ports 1010, one or more I/O components 1012, a power supply 1014, and one or more radios 1016.

Bus 1002 represents what may be one or more busses (such as an address bus, data bus, or combination thereof). Although the various blocks of FIG. 10 are shown with lines for the sake of clarity, in reality, these blocks represent logical, not necessarily actual, components. For example, one may consider a presentation component, such as a display device, to be an I/O component. Also, processors have memory. Accordingly, FIG. 10 is merely illustrative of an exemplary user device that can be used in connection with one or more embodiments of the technology disclosed herein.

User device 1000 can include a variety of computer-readable media. Computer-readable media can be any available media that can be accessed by user device 1000 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 1004 includes computer storage media in the form of volatile and/or nonvolatile memory. The memory 1004 may be removable, non-removable, or a combination thereof. Example hardware devices of memory 1004 may include solid-state memory, hard drives, optical-disc drives, other hardware, or one or more combinations thereof. As indicated above, the computer storage media of the memory 1004 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 1000, or one or more combinations thereof.

The one or more processors 1006 of user device 1000 can read data from various entities, such as the memory 1004 or the I/O component(s) 1012. The one or more processors 1006 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 1006 can execute instructions, for example, of an operating system of the user device 1000 or of one or more suitable applications.

The one or more presentation components 1008 can present data indications via user device 1000, another user device, or a combination thereof. Example presentation components 1008 may include a display device, speaker, printing component, vibrating component, another type of presentation component, or one or more combinations thereof. In some embodiments, the one or more presentation components 1008 may comprise one or more applications or services on a user device, across a plurality of user devices, or in the cloud. The one or more presentation components 1008 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof. For example, the one or more presentation components 1008 can present a visualization that compares a plurality of inspections of one or more cores of a central processing unit and a visualization of each task of each of the plurality of inspections.

The one or more I/O ports 1010 allow user device 1000 to be logically coupled to other devices, including the one or more I/O components 1012, some of which may be built in. Example I/O components 1012 can include a microphone, joystick, game pad, satellite dish, scanner, printer, wireless device, and the like. The one or more I/O components 1012 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 1008 on the user device 1000. In some embodiments, the user device 1000 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 1000 may, additionally or alternatively, be equipped with accelerometers or gyroscopes that enable detection of motion. In some embodiments, the output of the accelerometers or gyroscopes may be provided to the one or more presentation components 1008 of the user device 1000 to render immersive augmented reality or virtual reality.

The power supply 1014 of user device 1000 may be implemented as one or more batteries or another power source for providing power to components of the user device 1000. In embodiments, the power supply 1014 can include an external power supply, such as an AC adapter or a powered docking cradle that supplements or recharges the one or more batteries. In aspects, the external power supply can override one or more batteries or another type of power source located within the user device 1000.

Some embodiments of user device 1000 may include one or more radios 1016 (or similar wireless communication components). The one or more radios 1016 can transmit, receive, or both transmit and receive signals for wireless communications. In embodiments, the user device 1000 may be a wireless terminal adapted to receive communications and media over various wireless networks. User device 1000 may communicate using the one or more radios 1016 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 1016 may facilitate communication via radio frequency signals, frames, blocks, transmission streams, packets, messages, data items, data, another type of wireless communication, or one or more combinations thereof. The one or more radios 1016 may be capable of transmitting, receiving, or both transmitting and receiving wireless communications via mmWaves, FD-MIMO, massive MIMO, 3G, 4G, 5G, 6G, another type of Generation, 802.11 protocols and techniques, another type of wireless communication, or one or more combinations thereof.

Example embodiments described in and derived from the description above include the following:

Embodiment 1: A rooftop platform to facilitate a delivery of a parcel by an aerial vehicle, the rooftop platform comprising: an elevator apparatus at least partially accessible via the rooftop platform; a rotatable turntable mounted to the rooftop platform, the rotatable turntable having tracks for receiving track wheels of a parcel containment unit; and a landing area for the aerial vehicle to deliver or receive the parcel containment unit via the rotatable turntable.

Embodiment 2: The embodiment of claim 1, further comprising a shelter unit for the parcel containment unit, the shelter unit secured by a portion of the elevator apparatus, wherein a first operation of the rotatable turntable moves the parcel containment unit via the tracks from an open position to a covered position within the shelter unit.

Embodiment 3: The embodiments of claims 1-2, wherein a second operation of the rotatable turntable moves the parcel containment unit via the tracks in the open position to an interior position within a lift cabin of the elevator apparatus.

Embodiment 4: The embodiments of claims 1-3, wherein the elevator apparatus has a lift frame extending through a surface of the rooftop platform and an upper pulley support structure located at a height above the landing area of the rooftop platform.

Embodiment 5: The embodiments of claims 1-4, wherein the elevator apparatus is at least partially accessible via the rooftop platform from a top surface of a lift cabin of the elevator apparatus, wherein the top surface is capable of supporting the parcel containment unit.

Embodiment 6: The embodiments of claims 1-5, wherein a first operation of the rotatable turntable moves the parcel containment unit via the tracks from a first location on the rotatable turntable to a second location above the lift cabin.

Embodiment 7: The embodiments of claims 1-6, wherein the parcel containment unit comprises a plurality of lockers, each of the plurality of lockers having a locking system.

Embodiment 8: A method for facilitating delivery of a parcel by an aerial vehicle via a rooftop platform, the method comprising: receiving delivery data associated with the parcel; based at least in part on the delivery data, determining the parcel is to be delivered to the rooftop platform, the rooftop platform including an elevator apparatus at least partially accessible via the rooftop platform and a rotatable turntable mounted to the rooftop platform; receiving the parcel from the aerial vehicle at the rotatable turntable mounted to the rooftop platform; determining, via at least one sensor associated with the rooftop platform, that the parcel is secured by the rotatable turntable; and receiving the parcel at the elevator apparatus.

Embodiment 9: The embodiment of claim 9, further comprising: prior to receiving the parcel at the elevator apparatus, receiving a parcel containment unit, from the rotatable turntable via tracks mounted to the rotatable turntable, at a shelter unit secured to a portion of the elevator apparatus, wherein the parcel is positioned within a locker of the parcel containment unit having track wheels secured by the tracks of the rotatable turntable.

Embodiment 10: The embodiments of claims 8-9, further comprising: determining, via at least one sensor associated with the elevator apparatus, the parcel is positioned within a lift cabin of the elevator apparatus; and based on the delivery data, moving the lift cabin of the elevator apparatus to a particular floor located within a building under the rooftop platform.

Embodiment 11: The embodiments of claims 8-10, wherein the parcel is positioned on a parcel containment unit, wherein the parcel is secured via track wheels of the parcel containment unit positioned on tracks of the rotatable turntable, and wherein the parcel is received at the elevator apparatus by receiving the parcel containment unit at the elevator apparatus.

Embodiment 12: The embodiments of claims 8-11, further comprising: based on the delivery data and receiving the parcel containment unit at the elevator apparatus, moving the elevator apparatus to a particular floor within a building under the rooftop platform for delivery of the parcel from the parcel containment unit; and determining, via at least one sensor associated with the parcel containment unit, the parcel has been retrieved from the parcel containment unit.

Embodiment 13: The embodiments of claims 8-12, wherein the parcel was retrieved from the parcel containment unit by a robotic device.

Embodiment 14: The embodiments of claims 8-13, wherein the parcel containment unit is received by the elevator apparatus at a top surface of a lift cabin of the elevator apparatus, and wherein the lift cabin of the elevator apparatus is moved to the particular floor, such that the parcel containment unit is accessible from another floor above the particular floor.

Embodiment 15: One or more non-transitory computer storage media having computer-executable instructions embodied thereon, that when executed by at least one processor, cause operations comprising: receiving delivery data associated with a parcel; determining, via at least one sensor, that the parcel has been received, from an aerial vehicle, by a rotatable turntable mounted to a rooftop platform, the rooftop platform including an elevator apparatus at least partially accessible via the rooftop platform; and causing the rotatable turntable to position the parcel on the elevator apparatus.

Embodiment 16: The embodiment of claim 15, further comprising receiving the parcel on the elevator apparatus at a top surface of a lift cabin of the elevator apparatus, the parcel received from the rotatable turntable.

Embodiment 17: The embodiments of claims 15-16, further comprising: prior to receiving the parcel at the top surface, receiving the parcel, from the rotatable turntable via tracks mounted to the rotatable turntable, at a shelter unit secured to a portion of the elevator apparatus; and prior to receiving the parcel at the top surface, receiving, by the rotatable turntable, the parcel from the shelter unit.

Embodiment 18: The embodiments of claims 15-17, further comprising: wherein the elevator apparatus has a lift frame extending through a surface of the rooftop platform.

Embodiment 19: The embodiments of claims 15-18, wherein the aerial vehicle is a heavy lift UAV, and wherein the parcel is secured at the rotatable turntable via a parcel containment unit comprising a plurality of lockers, each of the plurality of lockers having a locking system.

Embodiment 20: The embodiments of claims 15-19, wherein the parcel containment unit is secured by the rotatable turntable via track wheels of the parcel containment unit and at least one track of the rotatable turntable.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims. The described technology may be made without departing from the scope, it is to be understood that all matter described herein or illustrated in the accompanying drawings is to be interpreted as illustrative and not in a limiting sense.

What is claimed is:

1. A system to facilitate a delivery of a parcel by an aerial vehicle, the system comprising:
   an elevator apparatus at least partially accessible via a rooftop platform;
   a rotatable turntable mounted to the rooftop platform, the rotatable turntable having tracks for receiving a parcel containment unit; and
   a landing area for the aerial vehicle to deliver or receive the parcel containment unit via the rotatable turntable.

2. The rooftop platform of claim 1, further comprising a shelter unit for the parcel containment unit, the shelter unit secured by a portion of the elevator apparatus, wherein a first operation of the rotatable turntable moves the parcel containment unit via the tracks from an open position to a covered position within the shelter unit.

3. The rooftop platform of claim 2, wherein a second operation of the rotatable turntable moves the parcel containment unit via the tracks in the open position to an interior position within a lift cabin of the elevator apparatus.

4. The rooftop platform of claim 1, wherein the elevator apparatus has a lift frame extending through a surface of the rooftop platform and an upper pulley support structure located at a height above the landing area of the rooftop platform.

5. The rooftop platform of claim 1, wherein the elevator apparatus is at least partially accessible via the rooftop platform from a top surface of a lift cabin of the elevator apparatus, wherein the top surface supports the parcel containment unit.

6. The rooftop platform of claim 5, wherein a first operation of the rotatable turntable moves the parcel containment unit via the tracks from a first location on the rotatable turntable to a second location above the lift cabin.

7. The rooftop platform of claim 1, wherein the parcel containment unit comprises a plurality of lockers, each of the plurality of lockers having a locking system.

8. A method for facilitating delivery of a parcel by an aerial vehicle via a rooftop platform, the method comprising:
   receiving delivery data associated with the parcel;
   based at least in part on the delivery data, determining the parcel is to be delivered to the rooftop platform, the rooftop platform including an elevator apparatus at least partially accessible via the rooftop platform and a rotatable turntable mounted to the rooftop platform;
   receiving the parcel from the aerial vehicle at the rotatable turntable mounted to the rooftop platform;
   determining, via at least one sensor associated with the rooftop platform, that the parcel is secured by the rotatable turntable; and
   receiving the parcel at the elevator apparatus.

9. The method of claim 8, further comprising:
   prior to receiving the parcel at the elevator apparatus, receiving a parcel containment unit, from the rotatable turntable via tracks mounted to the rotatable turntable, at a shelter unit secured to a portion of the elevator apparatus, wherein the parcel is positioned within a locker of the parcel containment unit secured by the tracks of the rotatable turntable.

10. The method of claim 8, further comprising:
    determining, via at least one sensor associated with the elevator apparatus, the parcel is positioned within a lift cabin of the elevator apparatus; and based on the delivery data, moving the lift cabin of the elevator apparatus to a particular floor located within a building under the rooftop platform.

11. The method of claim 8, wherein the parcel is positioned on a parcel containment unit, wherein the parcel is secured via track wheels of the parcel containment unit positioned on tracks of the rotatable turntable, and wherein the parcel is received at the elevator apparatus by receiving the parcel containment unit at the elevator apparatus.

12. The method of claim 11, further comprising:
based on the delivery data and receiving the parcel containment unit at the elevator apparatus, moving the elevator apparatus to a particular floor within a building under the rooftop platform for delivery of the parcel from the parcel containment unit; and
determining, via at least one sensor associated with the parcel containment unit, the parcel has been retrieved from the parcel containment unit.

13. The method of claim 12, wherein the parcel was retrieved from the parcel containment unit by a robotic device.

14. The method of claim 12, wherein the parcel containment unit is received by the elevator apparatus at a top surface of a lift cabin of the elevator apparatus, and wherein the lift cabin of the elevator apparatus is moved such that the parcel containment unit is accessible at the particular floor.

15. One or more computer storage media having computer-executable instructions embodied thereon, that when executed by at least one processor, cause operations comprising:
receiving delivery data associated with a parcel;
determining, via at least one sensor, that the parcel has been received, from an aerial vehicle, by a rotatable turntable mounted to a rooftop platform, the rooftop platform including an elevator apparatus at least partially accessible via the rooftop platform; and
causing the rotatable turntable to position the parcel on the elevator apparatus.

16. The one or more computer storage media of claim 15, further comprising receiving the parcel on the elevator apparatus at a top surface of a lift cabin of the elevator apparatus, the parcel received from the rotatable turntable.

17. The one or more computer storage media of claim 16, further comprising:
prior to receiving the parcel at the top surface, receiving the parcel, from the rotatable turntable via tracks mounted to the rotatable turntable, at a shelter unit secured to a portion of the elevator apparatus; and
prior to receiving the parcel at the top surface, receiving, by the rotatable turntable, the parcel from the shelter unit.

18. The one or more computer storage media of claim 15, wherein the elevator apparatus has a lift frame extending through a surface of the rooftop platform.

19. The one or more computer storage media of claim 15, wherein the parcel is secured at the rotatable turntable via a parcel containment unit comprising a plurality of lockers, each of the plurality of lockers having a locking system.

20. The one or more computer storage media of claim 19, wherein the parcel containment unit is secured by the rotatable turntable via track wheels of the parcel containment unit and at least one track of the rotatable turntable.

* * * * *